(12) United States Patent
Koda et al.

(10) Patent No.: US 10,370,525 B2
(45) Date of Patent: Aug. 6, 2019

(54) RUBBER COMPOSITIONS

(71) Applicant: KURARAY CO., LTD., Kurashiki-shi (JP)

(72) Inventors: Daisuke Koda, Kamisu (JP); Kei Hirata, Kamisu (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 15/125,420

(22) PCT Filed: Mar. 10, 2015

(86) PCT No.: PCT/JP2015/056903
§ 371 (c)(1),
(2) Date: Sep. 12, 2016

(87) PCT Pub. No.: WO2015/137295
PCT Pub. Date: Sep. 17, 2015

(65) Prior Publication Data
US 2017/0073509 A1 Mar. 16, 2017

(30) Foreign Application Priority Data
Mar. 14, 2014 (JP) ................................. 2014-051806

(51) Int. Cl.
| | | |
|---|---|---|
| *C08L 9/06* | (2006.01) | |
| *B60C 1/00* | (2006.01) | |
| *C08L 15/00* | (2006.01) | |
| *C08L 7/00* | (2006.01) | |
| *C08C 19/28* | (2006.01) | |
| *C08K 3/06* | (2006.01) | |
| *C08K 3/36* | (2006.01) | |
| *C08K 5/09* | (2006.01) | |
| *C08K 5/47* | (2006.01) | |
| *C08K 5/548* | (2006.01) | |
| *C08L 91/00* | (2006.01) | |
| *C08L 91/06* | (2006.01) | |
| C08F 136/06 | (2006.01) | |
| C08F 236/06 | (2006.01) | |

(52) U.S. Cl.
CPC .................. *C08L 9/06* (2013.01);
*B60C 1/00* (2013.01); *C08C 19/28* (2013.01);
*C08K 3/06* (2013.01); *C08K 3/36* (2013.01);
*C08K 5/09* (2013.01); *C08K 5/47* (2013.01);
*C08K 5/548* (2013.01); *C08L 7/00* (2013.01);
*C08L 15/00* (2013.01); *C08L 91/00* (2013.01);
*C08L 91/06* (2013.01); C08F 136/06
(2013.01); C08F 236/06 (2013.01); *C08L 2205/06* (2013.01); *Y02T 10/862* (2013.01)

(58) Field of Classification Search
CPC .... C08K 9/06; C08K 3/36; C08L 9/06; C08L 2205/06; C08L 15/00; C08L 7/00; B60C 1/00; C08C 19/28

USPC ........................................................ 523/156
See application file for complete search history.

(56) References Cited

U.S. PATENT DOCUMENTS

| | | | | | |
|---|---|---|---|---|---|
| 4,218,349 | A | * | 8/1980 | Minatono | ................. C08L 7/00 524/474 |
| 4,555,547 | A | * | 11/1985 | Ueda | ..................... B60C 1/0016 525/194 |
| 2004/0024093 | A1 | * | 2/2004 | Weydert | .................... C08L 7/00 524/47 |
| 2004/0266915 | A1 | * | 12/2004 | Kirino | .................... C08K 5/548 523/212 |
| 2008/0110544 | A1 | | 5/2008 | Nakamura | |

(Continued)

FOREIGN PATENT DOCUMENTS

| | | |
|---|---|---|
| CN | 1747996 A | 3/2006 |
| CN | 101273086 A | 9/2008 |

(Continued)

OTHER PUBLICATIONS

International Search Report and Written Opinion dated Jun. 16, 2015 in PCT/JP2015/056903 (submitting English translation only).

(Continued)

*Primary Examiner* — Doris L Lee
(74) *Attorney, Agent, or Firm* — Oblon, McClelland, Maier & Neustadt, L.L.P.

(57) ABSTRACT

[Object]
The invention provides rubber compositions having excellent filler dispersibility, crosslinked products having excellent properties such as abrasion resistance, and tires that exhibit enhanced rolling resistance performance and attain simultaneous enhancements in steering stability and ice grip performance by virtue of using the compositions or the crosslinked products in portions of the tires.

[Solution]
The rubber composition includes 100 parts by mass of a solid rubber (A), 0.1 to 10 parts by mass of a modified liquid diene rubber (B) that is obtained by adding a modifying agent to an unmodified liquid diene rubber (B') and has functional groups derived from the modifying agent, and 20 to 150 parts by mass of a filler (C). The modified liquid diene rubber (B) satisfies the following (i) to (iv): (i) the content of butadiene units is not less than 50 mass % relative to the total of all monomer units, (ii) the weight average molecular weight (Mw) is 25,000 to 120,000, (iii) the amount of the modifying agent added is 3 to 40 parts by mass per 100 parts by mass of the unmodified liquid diene rubber (B'), and (iv) the average number of functional groups per molecule of the modified liquid diene rubber (B) is 5 to 80.

22 Claims, No Drawings

(56) References Cited

U.S. PATENT DOCUMENTS

| | | | |
|---|---|---|---|
| 2010/0152368 A1* | 6/2010 | Hirayama | C08L 21/00 524/570 |
| 2012/0258396 A1* | 10/2012 | Debies | G03G 9/0804 430/137.14 |
| 2014/0080978 A1 | 3/2014 | Ohi et al. | |
| 2016/0200902 A1 | 7/2016 | Koda et al. | |

FOREIGN PATENT DOCUMENTS

| | | |
|---|---|---|
| CN | 103562297 A | 2/2014 |
| EP | 3 037 467 | 6/2016 |
| JP | 60-124639 A | 7/1985 |
| JP | 4-225046 A | 8/1992 |
| JP | 7-292159 A | 11/1995 |
| JP | 2006-213777 A | 8/2006 |
| JP | 2008-38059 A | 2/2008 |
| JP | 2008-120895 A | 5/2008 |
| JP | 2009-13381 A | 1/2009 |
| JP | 2009-138094 A | 6/2009 |
| JP | 2010-77233 A | 4/2010 |
| JP | 2011-132298 A | 7/2011 |
| JP | 2013-33244 A | 2/2013 |
| JP | 2013-144743 | 7/2013 |
| JP | 2015-44904 A | 3/2015 |
| JP | 2015-86280 A | 5/2015 |
| WO | WO 2012/165543 A1 | 12/2012 |

OTHER PUBLICATIONS

Combined Chinese Office Action and Search Report dated Apr. 19, 2017 in Patent Application No. 201580013681.8 (with English translation of Categories of Cited Documents).

Supplementary European Search Report dated Nov. 7, 2017 in corresponding Application No. 15761051.0.

Taiwanese Office Action dated Sep. 7, 2018, in Taiwanese Patent Application No. 104107846.

Office Action dated Jan. 8, 2019, in Japanese Patent Application No. 2016-080924, filed Dec. 21, 2018.

Decision of Refusal dated Apr. 23, 2019, in Japanese Patent Application No. 2016-080924.

* cited by examiner

RUBBER COMPOSITIONS

TECHNICAL FIELD

The present invention relates to rubber compositions.

BACKGROUND ART

Fillers such as silicas and carbon blacks are conventionally added to rubber components such as natural rubbers and styrene butadiene rubbers to enhance mechanical strength. Such rubber compositions are widely used for tires requiring abrasion resistance and mechanical strength. Because rubber compositions including fillers exhibit an increased viscosity during the kneading, rolling and extrusion of the rubbers, plasticizers such as process oils are used in order to improve the processability and the flowability.

Even if properties such as mechanical strength and hardness are appropriate as the compositions are just produced, the rubbers used in applications such as tires degrade their performance during long use. This problem is caused by the migration of additives such as plasticizers to the surface of the rubbers.

One approach to preventing the migration of additives such as plasticizers is to add liquid diene rubbers to rubber compositions in place of conventional plasticizers such as process oils. Rubber compositions prepared in this manner attain excellent processability, and crosslinked products thereof are advantageously prevented from the migration of the components after crosslinking (see, for example, Patent Literatures 1 and 2).

However, rubber compositions containing liquid diene rubbers sometimes have insufficient filler dispersibility. Further, crosslinked products of such rubber compositions do not necessarily have sufficient properties such as mechanical strength and abrasion resistance at all times. Furthermore, crosslinked products of such rubber compositions, in particular, tires are demanded to achieve further improvements not only in mechanical strength such as tensile strength but also in rolling resistance performance. In addition, it is desired that such tires overcome the general difficulty in achieving simultaneous enhancements in steering stability and ice grip performance.

CITATION LIST

Patent Literature

Patent Literature 1: JP-A-2008-120895
Patent Literature 2: JP-A-2010-77233

SUMMARY OF INVENTION

Technical Problem

The present invention has been made in light of the circumstances described above, and provides rubber compositions that have excellent filler dispersibility, crosslinked products that are excellent in such properties as mechanical strength such as tensile strength and abrasion resistance, and tires that exhibit enhanced rolling resistance performance and attain simultaneous enhancements in steering stability and ice grip performance by virtue of using the compositions or the crosslinked products in portions of the tires.

Solution to Problem

After extensive studies, the present inventors have found that the incorporation of at least a specific modified liquid diene rubber to a rubber composition results in excellent filler dispersibility, and the obtainable rubber composition can give crosslinked products excellent in such properties as mechanical strength such as tensile strength and abrasion resistance to achieve enhancements in steering stability, ice grip performance and rolling resistance performance. Based on the finding, the present inventors have completed the present invention.

Specifically, the present invention pertains to the following aspects [1] to [7].

[1] A rubber composition including 100 parts by mass of a solid rubber (A), 0.1 to 10 parts by mass of a modified liquid diene rubber (B) that is obtained by adding a modifying agent to an unmodified liquid diene rubber (B') and has functional groups derived from the modifying agent, and 20 to 150 parts by mass of a filler (C), the modified liquid diene rubber (B) satisfying the following (i) to (iv):

(i) the content of butadiene units is not less than 50 mass % relative to the total of all monomer units, (ii) the weight average molecular weight (Mw) is 25,000 to 120,000, (iii) the amount of the modifying agent added is 3 to 40 parts by mass per 100 parts by mass of the unmodified liquid diene rubber (B'), and (iv) the average number of functional groups per molecule of the modified liquid diene rubber (B) is 5 to 80.

[2] The rubber composition described in [1], wherein the functional groups possessed by the modified liquid diene rubber (B) are at least one selected from carboxylic anhydride groups, dicarboxylic acid monoester groups and dicarboxylic acid monoamide groups.

[3] The rubber composition described in [2], wherein the functional groups possessed by the modified liquid diene rubber (B) are at least one selected from maleic anhydride groups, succinic anhydride groups, maleic acid monoester groups, succinic acid monoester groups, maleic acid monoamide groups and succinic acid monoamide groups.

[4] The rubber composition described in any of [1] to [3], wherein the modified liquid diene rubber (B) has a functional group equivalent weight of 150 to 6,500 g/eq.

[5] The rubber composition described in any of [1] to [4], wherein the filler (C) is at least one filler selected from carbon blacks and silicas.

[6] A crosslinked product obtained by crosslinking the rubber composition described in any of [1] to [5].

[7] A tire including the rubber composition described in any of [1] to [5] or the crosslinked product described in [6] in at least a portion of the tire.

Advantageous Effects of Invention

The rubber compositions obtained according to the invention have excellent filler dispersibility and can give crosslinked products which are excellent in such properties as mechanical strength such as tensile strength and abrasion resistance, exhibit enhanced steering stability, ice grip performance and rolling resistance performance, and can attain high hardness. The rubber compositions or the crosslinked products of the compositions are useful to constitute, for example, at least portions of tires. Tires using the compositions or the like attain enhancements in the performances described above.

DESCRIPTION OF EMBODIMENTS

[Solid Rubbers (A)]

The solid rubber (A) used in the rubber composition of the invention is a rubber that can be handled as a solid at 20° C. The Moony viscosity $ML_{1+4}$ of the solid rubber (A) at 100° C. is usually in the range of 20 to 200. Examples of the solid rubbers (A) include natural rubbers, styrene butadiene rubbers (hereinafter, also written as "SBRs"), butadiene rubbers, isoprene rubbers, butyl rubbers, halogenated butyl rubbers, ethylene propylene diene rubbers, butadiene acrylonitrile copolymer rubbers, chloroprene rubbers, acrylic rubbers, fluororubbers and urethane rubbers. Of these solid rubbers (A), natural rubbers, SBRs, butadiene rubbers and isoprene rubbers are preferable, and natural rubbers and SBRs are more preferable. The solid rubbers (A) may be used singly, or two or more may be used in combination.

To ensure that the obtainable rubber composition and crosslinked products will exhibit desired properties sufficiently, the number average molecular weight (Mn) of the solid rubber (A) is preferably not less than 80,000, and more preferably in the range of 100,000 to 3,000,000. In the present specification, the number average molecular weight is a polystyrene equivalent number average molecular weight measured by gel permeation chromatography (GPC).

Examples of the natural rubbers include those natural rubbers, high-purity natural rubbers and modified natural rubbers such as epoxidized natural rubbers, hydroxylated natural rubbers, hydrogenated natural rubbers and grafted natural rubbers generally used in the tire industry, with specific examples including TSRs such as SMRs, SIRs and STRs, and RSSs. Of these, SMR 20, STR 20 and RSS #3 are preferable from the points of view of uniform quality and high availability. The natural rubbers may be used singly, or two or more may be used in combination.

The SBRs may be any generally used in tire applications. Specifically, those rubbers having a styrene content of 0.1 to 70 mass % are preferable, and the styrene content is more preferably 5 to 50 mass %, and still more preferably 15 to 35 mass %. Further, those rubbers having a vinyl content of 0.1 to 60 mass % are preferable, and the vinyl content is more preferably 0.1 to 55 mass %.

The weight average molecular weight (Mw) of the SBRs is preferably 100,000 to 2,500,000, more preferably 150,000 to 2,000,000, and still more preferably 200,000 to 1,500,000. This molecular weight ensures that processability and mechanical strength are satisfied at the same time.

In the present specification, the weight average molecular weight is a polystyrene equivalent weight average molecular weight measured by gel permeation chromatography (GPC).

The SBRs used in the invention preferably have a glass transition temperature of −95 to 0° C., and more preferably −95 to −5° C. as measured by differential thermal analysis. With the glass transition temperature being limited to the above range, the viscosity of the SBR allows easy handling of the rubber.

SBR which may be used in the invention may be obtained by copolymerizing styrene and butadiene. The SBR production process is not particularly limited and may be any of emulsion polymerization, solution polymerization, gas-phase polymerization and bulk polymerization. Of these production processes, emulsion polymerization and solution polymerization are preferable.

An emulsion-polymerized styrene butadiene rubber (hereinafter, also written as E-SBR) may be produced by a usual emulsion polymerization process that is known or is deemed as known. For example, such a rubber may be obtained by emulsifying and dispersing prescribed amounts of styrene and butadiene monomers in the presence of an emulsifier and emulsion polymerizing the monomers with a radical polymerization initiator.

A solution polymerized styrene butadiene rubber (hereinafter, also written as S-SBR) may be produced by a usual solution polymerization process. For example, styrene and butadiene are polymerized in a solvent with an active metal capable of catalyzing anionic polymerization optionally in the presence of a polar compound as desired.

Examples of the solvents include aliphatic hydrocarbons such as n-butane, n-pentane, isopentane, n-hexane, n-heptane and isooctane; alicyclic hydrocarbons such as cyclopentane, cyclohexane and methylcyclopentane; and aromatic hydrocarbons such as benzene and toluene. It is usually preferable to use the solvent in such an amount that the monomer concentration will be 1 to 50 mass %.

Examples of the active metals capable of catalyzing anionic polymerization include alkali metals such as lithium, sodium and potassium; alkaline-earth metals such as beryllium, magnesium, calcium, strontium and barium; and lanthanoid rare earth metals such as lanthanum and neodymium. Of these active metals, alkali metals and alkaline-earth metals are preferable, and alkali metals are more preferable. Of the alkali metals, organoalkali metal compounds are more preferably used.

Examples of the organoalkali metal compounds include organomonolithium compounds such as n-butyllithium, sec-butyllithium, t-butyllithium, hexyllithium, phenyllithium and stilbenelithium; polyfunctional organolithium compounds such as dilithiomethane, 1,4-dilithiobutane, 1,4-dilithio-2-ethylcyclohexane and 1,3,5-trilithiobenzene; sodium naphthalene and potassium naphthalene. In particular, organolithium compounds are preferable, and organomonolithium compounds are more preferable. The amount in which the organoalkali metal compounds are used may be determined appropriately in accordance with the desired molecular weight of S-SBR.

The organoalkali metal compound may be used in the form of an organoalkali metal amide by being subjected to a reaction with a secondary amine such as dibutylamine, dihexylamine or dibenzylamine.

The polar compounds are not particularly limited as long as the compounds do not deactivate the anionic polymerization reaction and are generally used for the purposes of controlling the microstructure of butadiene moieties and controlling the distribution of styrene in copolymer chains. Examples include ether compounds such as dibutyl ether, tetrahydrofuran and ethylene glycol diethyl ether; tertiary amines such as tetramethylethylenediamine and trimethylamine; alkali metal alkoxides and phosphine compounds.

The temperature of the polymerization reaction is usually in the range of −80 to 150° C., preferably 0 to 100° C., and more preferably 30 to 90° C. The polymerization mode may be batchwise or continuous. To enhance the random copolymerizability of styrene and butadiene, it is preferable to supply styrene and butadiene into the reaction liquid continuously or intermittently so that styrene and butadiene in the polymerization system will have a specific composition.

The polymerization reaction may be terminated by the addition of an alcohol such as methanol or isopropanol as a polymerization terminator. After the termination of the polymerization reaction, the target S-SBR may be recovered by separating the solvent from the polymerization solution by a method such as direct drying or steam stripping. The polymerization solution may be mixed together with an extender oil before the removal of the solvent, and the rubber may be recovered as an oil-extended rubber.

As long as the advantageous effects of the invention are not impaired, the SBR may be a modified SBR obtained by introducing functional groups into SBR. Examples of the functional groups include amino groups, alkoxysilyl groups, hydroxyl groups, epoxy groups and carboxyl groups.

For example, the modified SBR may be produced by adding, before the addition of the polymerization terminator, an agent capable of reacting with active ends of the polymer, for example, a coupling agent such as tin tetrachloride, tetrachlorosilane, dimethyldichlorosilane, dimethyldiethoxysilane, tetramethoxysilane, tetraethoxysilane, 3-aminopropyltriethoxysilane, tetraglycidyl-1,3-bisaminomethylcyclohexane or 2,4-tolylene diisocyanate, a chain end-modifying agent such as 4,4'-bis(diethylamino)benzophenone or N-vinylpyrrolidone, or any of modifying agents described in JP-A-2011-132298.

In the modified SBR, the functional groups may be introduced at polymer ends or polymer side chains.

Examples of the butadiene rubbers include commercially available butadiene rubbers polymerized with Ziegler catalysts such as titanium tetrahalide-trialkylaluminum systems, diethylaluminum chloride-cobalt systems, trialkylaluminum-boron trifluoride-nickel systems and diethylaluminum chloride-nickel systems; lanthanoid rare earth metal catalysts such as triethylaluminum-organic acid neodymium-Lewis acid systems; or organoalkali metal compounds similarly to the S-SBRs. Ziegler-catalyzed butadiene rubbers are preferable because they have a high cis content. Use may be made of ultrahigh cis butadiene rubbers obtained using lanthanoid rare earth metal catalysts.

The vinyl content in the butadiene rubbers is preferably not more than 50 mass %, more preferably not more than 40 mass %, and still more preferably not more than 30 mass %. If the vinyl content exceeds 50 mass %, the rolling resistance performance tends to deteriorate. The lower limit of the vinyl content is not particularly limited. The glass transition temperature, although variable depending on the vinyl content, is preferably not more than −40° C., and more preferably not more than −50° C.

The weight average molecular weight (Mw) of the butadiene rubbers is preferably 90,000 to 2,000,000, and more preferably 150,000 to 1,500,000. This Mw ensures that high processability and mechanical strength are obtained.

As long as the advantageous effects of the invention are not impaired, the butadiene rubbers may have branched partial structures or polar functional groups that are introduced by using polyfunctional modifiers, for example, tin tetrachloride, silicon tetrachloride, alkoxysilanes having an epoxy group in the molecule, or amino group-containing alkoxysilanes.

Examples of the isoprene rubbers include commercially available isoprene rubbers polymerized with Ziegler catalysts such as titanium tetrahalide-trialkylaluminum systems, diethylaluminum chloride-cobalt systems, trialkylaluminum-boron trifluoride-nickel systems and diethylaluminum chloride-nickel systems; lanthanoid rare earth metal catalysts such as triethylaluminum-organic acid neodymium-Lewis acid systems; or organoalkali metal compounds similarly to the S-SBRs. Ziegler-catalyzed isoprene rubbers are preferable because they have a high cis content. Use may be made of ultrahigh cis isoprene rubbers obtained using lanthanoid rare earth metal catalysts.

The vinyl content in the isoprene rubbers is preferably not more than 50 mass %, more preferably not more than 40 mass %, and still more preferably not more than 30 mass %. If the vinyl content exceeds 50 mass %, the rolling resistance performance tends to deteriorate. The lower limit of the vinyl content is not particularly limited. The glass transition temperature, although variable depending on the vinyl content, is preferably not more than −20° C., and more preferably not more than −30° C.

The weight average molecular weight (Mw) of the isoprene rubbers is preferably 90,000 to 2,000,000, and more preferably 150,000 to 1,500,000. This Mw ensures that high processability and mechanical strength are obtained.

As long as the advantageous effects of the invention are not impaired, the isoprene rubbers may have branched partial structures or polar functional groups that are introduced by using polyfunctional modifiers, for example, tin tetrachloride, silicon tetrachloride, alkoxysilanes having an epoxy group in the molecule, or amino group-containing alkoxysilanes.

[Modified Liquid Diene Rubbers (B)]

The modified liquid diene rubber (B) used in the inventive rubber composition is a liquid polymer which has a butadiene unit content of not less than 50 mass % relative to all the monomer units constituting the polymer, and a weight average molecular weight (Mw) of 25,000 to 120,000. The modified rubber is obtained by adding a modifying agent to an unmodified liquid diene rubber (B') and the amount of the modifying agent added is in the range of 3 to 40 parts by mass per 100 parts by mass of the unmodified liquid diene rubber (B'). In the modified liquid diene rubber (B), the average number of functional groups derived from the modifying agent is in the range of 5 to 80 per molecule of the polymer. In the rubber composition of the invention, the modified liquid diene rubber (B) has a high affinity for a filler (C) described later and allows the filler (C) to be dispersed excellently in the rubber composition. Further, the incorporation of the modified diene rubber (B) ensures that the obtainable rubber composition exhibits excellent crosslinkability. Furthermore, the obtainable rubber composition can give crosslinked products which not only exhibit excellent mechanical properties such as tensile break strength and abrasion resistance but also, when used in, for example, tires or the like, achieve simultaneous enhancements in steering stability and ice grip performance and also an enhancement in rolling resistance performance.

The unmodified liquid diene rubber (B') serving as a raw material for the modified liquid diene rubber (B) contains butadiene units in an amount of not less than 50 mass % relative to all the monomer units constituting the polymer. The butadiene unit content is preferably 60 to 100 mass %, and more preferably 70 to 100 mass % relative to all the monomer units forming the liquid diene rubber (B').

In addition to the butadiene units, the liquid diene rubber (B') may contain other monomer units such as units of conjugated dienes (b1) other than butadiene, and units of aromatic vinyl compounds (b2).

Examples of the conjugated dienes (b1) include isoprene, 2,3-dimethylbutadiene, 2-phenylbutadiene, 1,3-pentadiene, 2-methyl-1,3-pentadiene, 1,3-hexadiene, 1,3-octadiene, 1,3-cyclohexadiene, 2-methyl-1,3-octadiene, 1,3,7-octatriene, myrcene and chloroprene. Of these conjugated dienes (b1), isoprene is preferable. The conjugated dienes may be used singly, or two or more may be used in combination.

Examples of the aromatic vinyl compounds (b2) include styrene, α-methylstyrene, 2-methylstyrene, 3-methylstyrene, 4-methylstyrene, 4-propylstyrene, 4-t-butylstyrene, 4-cyclohexylstyrene, 4-dodecylstyrene, 2,4-dimethylstyrene, 2,4-diisopropylstyrene, 2,4,6-trimethylstyrene, 2-ethyl-4-benzylstyrene, 4-(phenylbutyl)styrene, 1-vinylnaphthalene, 2-vinylnaphthalene, vinylanthracene, N,N-diethyl-4-aminoethylstyrene, vinylpyridine, 4-methoxystyrene, monochlorostyrene, dichlorostyrene and divinylbenzene. Of these aromatic vinyl compounds, styrene, α-methylstyrene and 4-methylstyrene are preferable.

In the unmodified liquid diene rubber (B'), the content of the monomer units other than the butadiene units is preferably not more than 50 mass %, more preferably not more than 40 mass %, and still more preferably not more than 30 mass %. When the content of, for example, vinyl aromatic compound (b2) units is within the above range, the processability of the rubber composition tends to be enhanced.

The unmodified liquid diene rubber (B') is preferably a polymer obtained by polymerizing butadiene and optionally additional monomers other than butadiene by a process such as, for example, emulsion polymerization or solution polymerization.

The emulsion polymerization process may be a known process or a process that is deemed as known. For example, monomers including a prescribed amount of the conjugated diene may be emulsified and dispersed in the presence of an emulsifier and may be emulsion polymerized with use of a radical polymerization initiator.

Examples of the emulsifiers include long-chain fatty acid salts having 10 or more carbon atoms, and rosin acid salts. Examples of the long-chain fatty acid salts include potassium salts and sodium salts of fatty acids such as capric acid, lauric acid, myristic acid, palmitic acid, oleic acid and stearic acid.

Usually, water is used as a dispersant. The dispersant may include a water-soluble organic solvent such as methanol or ethanol as long as the stability during the polymerization is not impaired.

Examples of the radical polymerization initiators include persulfate salts such as ammonium persulfate and potassium persulfate, organic peroxides and hydrogen peroxide.

To control the molecular weight of the obtainable unmodified liquid diene rubber (B'), a chain transfer agent may be used. Examples of the chain transfer agents include mercaptans such as t-dodecylmercaptan and n-dodecylmercaptan; carbon tetrachloride, thioglycolic acid, diterpene, terpinolene, γ-terpinene and α-methylstyrene dimer.

The temperature of the emulsion polymerization may be selected appropriately in accordance with, for example, the type of the radical polymerization initiator used. The temperature is usually in the range of 0 to 100° C., and preferably in the range of 0 to 60° C. The polymerization mode may be continuous or batchwise.

The polymerization reaction may be terminated by the addition of a polymerization terminator. Examples of the polymerization terminators include amine compounds such as isopropylhydroxylamine, diethylhydroxylamine and hydroxylamine, quinone compounds such as hydroquinone and benzoquinone, and sodium nitrite.

The termination of the polymerization reaction may be followed by the addition of an antioxidant as required. After the termination of the polymerization reaction, the latex obtained is cleaned of the unreacted monomers as required, and the liquid diene rubber (B') is coagulated by the addition of a coagulant salt such as sodium chloride, calcium chloride or potassium chloride optionally together with an acid such as nitric acid or sulfuric acid to control the pH of the coagulated system to a prescribed value. The dispersion solvent is then separated, thereby recovering the polymer. Next, the polymer is washed with water, dehydrated and dried. In this manner, the liquid diene rubber (B') may be obtained. During the coagulation process, the latex may be mixed together with an emulsified dispersion of an extender oil as required, and the unmodified liquid diene rubber (B') may be recovered as an oil-extended rubber.

The solution polymerization process may be a known process or a process that is deemed as known. For example, monomers including the conjugated diene are polymerized in a solvent with a Ziegler catalyst, a metallocene catalyst or an active metal or an active metal compound capable of catalyzing anionic polymerization, optionally in the presence of a polar compound as desired.

Examples of the solvents include aliphatic hydrocarbons such as n-butane, n-pentane, isopentane, n-hexane, n-heptane and isooctane; alicyclic hydrocarbons such as cyclopentane, cyclohexane and methylcyclopentane; and aromatic hydrocarbons such as benzene, toluene and xylene.

Examples of the active metals capable of catalyzing anionic polymerization include alkali metals such as lithium, sodium and potassium; alkaline-earth metals such as beryllium, magnesium, calcium, strontium and barium; and lanthanoid rare earth metals such as lanthanum and neodymium.

Of the active metals capable of catalyzing anionic polymerization, alkali metals and alkaline-earth metals are preferable, and alkali metals are more preferable.

Preferred active metal compounds capable of catalyzing anionic polymerization are organoalkali metal compounds. Examples of the organoalkali metal compounds include organomonolithium compounds such as methyllithium, ethyllithium, n-butyllithium, sec-butyllithium, t-butyllithium, hexyllithium, phenyllithium and stilbenelithium; polyfunctional organolithium compounds such as dilithiomethane, dilithionaphthalene, 1,4-dilithiobutane, 1,4-dilithio-2-ethylcyclohexane and 1,3,5-trilithiobenzene; sodium naphthalene and potassium naphthalene. Of these organoalkali metal compounds, organolithium compounds are preferable, and organomonolithium compounds are more preferable.

The amount in which the organoalkali metal compounds are used may be determined appropriately in accordance with factors such as the melt viscosities and molecular weights of the unmodified liquid diene rubber (B') and the modified liquid diene rubber (B). Usually, the amount of such compounds is 0.01 to 3 parts by mass per 100 parts by mass of all the monomers including the conjugated diene.

The organoalkali metal compound may be used in the form of an organoalkali metal amide by being subjected to a reaction with a secondary amine such as dibutylamine, dihexylamine or dibenzylamine.

The polar compounds are usually used for the purpose of controlling the microstructure of conjugated diene moieties without deactivating the anionic polymerization reaction. Examples of the polar compounds include ether compounds such as dibutyl ether, tetrahydrofuran and ethylene glycol diethyl ether; tertiary amines such as tetramethylethylenediamine and trimethylamine; alkali metal alkoxides and phosphine compounds. The polar compounds are usually used in an amount of 0.01 to 1000 mol relative to 1 mol of the organoalkali metal compound.

The temperature of the solution polymerization is usually in the range of −80 to 150° C., preferably 0 to 100° C., and more preferably 10 to 90° C. The polymerization mode may be batchwise or continuous.

The polymerization reaction may be terminated by the addition of a polymerization terminator. Examples of the polymerization terminators include alcohols such as methanol and isopropanol. The unmodified liquid diene rubber (B') may be isolated by pouring the polymerization reaction liquid into a poor solvent such as methanol to precipitate the unmodified liquid diene rubber (B'), or by washing the polymerization reaction liquid with water followed by separation and drying.

Of the processes for producing the unmodified liquid diene rubber (B') described hereinabove, the solution polymerization process is particularly preferable.

The unmodified liquid diene rubber (B') obtained as described above may be directly subjected to the modification with functional groups described later, or may be modified after at least part of the unsaturated bonds present in the liquid diene rubber are hydrogenated.

The unmodified liquid diene rubber (B') is modified with various functional groups into the modified liquid diene rubber (B). Examples of the functional groups include amino groups, amide groups, imino groups, imidazole groups, urea groups, alkoxysilyl groups, hydroxyl groups, epoxy groups, ether groups, carboxyl groups, carbonyl groups, mercapto groups, isocyanate groups, nitrile groups, acid anhydride groups such as carboxylic anhydride groups, dicarboxylic acid monoester groups and dicarboxylic acid monoamide groups.

For example, the modified liquid diene rubber (B) may be produced by adding, before the addition of the polymerization terminator, a modifying agent capable of reacting with active ends of the polymer to the unmodified liquid diene rubber (B'). Examples of such modifying agents include those modifying agents categorized as coupling agents such as tin tetrachloride, dibutyltin chloride, tetrachlorosilane, dimethyldichlorosilane, dimethyldiethoxysilane, tetramethoxysilane, tetraethoxysilane, 3-aminopropyltriethoxysilane, tetraglycidyl-1,3-bisaminomethylcyclohexane and 2,4-tolylene diisocyanate, polymer end modifying agents such as 4,4'-bis(diethylamino)benzophenone, N-vinylpyrrolidone, N-methylpyrrolidone, 4-dimethylaminobenzylideneaniline and dimethylimidazolidinone, and other modifying agents such as those described in JP-A-2011-132298.

In particular, the modified liquid diene rubber (B) used in the present invention is preferably one that is produced by the graft reaction in which an unsaturated carboxylic acid and/or an unsaturated carboxylic acid derivative is added as the modifying agent to the unmodified liquid diene rubber (B') that has been isolated. Such a modified rubber is advantageous in that the rubber attains an enhanced affinity for fillers.

Examples of the unsaturated carboxylic acids include maleic acid, fumaric acid, itaconic acid and (meth)acrylic acid.

Examples of the unsaturated carboxylic acid derivatives include unsaturated dicarboxylic acid anhydrides such as maleic anhydride and itaconic anhydride; unsaturated dicarboxylic acid monoesters such as maleic acid monoesters, itaconic acid monoesters and fumaric acid monoesters; (meth)acrylate esters such as glycidyl (meth)acrylate and hydroxyethyl (meth)acrylate; unsaturated dicarboxylic acid monoamides such as maleic acid monoamides, itaconic acid monoamides and fumaric acid monoamides; and unsaturated carboxylic acid imides such as maleic acid imides and itaconic acid imides.

From the point of view of economic efficiency and to ensure that the inventive rubber composition and crosslinked products will sufficiently exhibit desired characteristics, the modified liquid diene rubber (B) is preferably one that is obtained by adding an unsaturated dicarboxylic acid anhydride, an unsaturated dicarboxylic acid monoester or an unsaturated dicarboxylic acid monoamide as the modifying agent to the unmodified liquid diene rubber (B') and has functional groups derived from the modifying agent which are at least one selected from carboxylic anhydride groups, dicarboxylic acid monoester groups and dicarboxylic acid monoamide groups. More preferably, the modified liquid diene rubber (B) is one that is obtained by adding maleic anhydride, a maleic acid monoester or a maleic acid monoamide as the modifying agent to the unmodified liquid diene rubber (B') and has functional groups derived from the modifying agent which are at least one selected from maleic anhydride groups, succinic anhydride groups, maleic acid monoester groups, succinic acid monoester groups, maleic acid monoamide groups and succinic acid monoamide groups.

The modifying agent may be introduced into the unmodified liquid diene rubber (B') by any method without limitation. For example, an unsaturated carboxylic acid or a derivative thereof and further a radical catalyst as required may be added to the liquid diene rubber and the mixture may be heated in the presence of or without an organic solvent.

For example, the organic solvent used in the above method is usually a hydrocarbon solvent or a halogenated hydrocarbon solvent. Of these organic solvents, hydrocarbon solvents such as n-butane, n-hexane, n-heptane, cyclohexane, benzene, toluene and xylene are preferable.

Examples of the radical catalysts for use in the above method include di-s-butyl peroxydicarbonate, t-amyl peroxypivalate, t-amyl peroxy-2-ethylhexanoate and azobisisobutyronitrile. Of these radical catalysts, azoisobutyronitrile is preferable.

From the point of view of aspects such as to suppress side reactions, an antioxidant may be added during the addition reaction of the modifying agent by the above method.

In an embodiment, the unmodified liquid diene rubber (B') may be addition reacted with an unsaturated carboxylic acid anhydride in the manner described hereinabove to form a modified liquid diene rubber having carboxylic anhydride groups, and thereafter the modified liquid diene rubber may be reacted with such a compound as an alcohol, ammonia or an amine to form a modified liquid diene rubber having dicarboxylic acid monoester groups or a modified liquid diene rubber having dicarboxylic acid monoamide groups as the modified liquid diene rubber (B).

The amount of the modifying agent added in the modified liquid diene rubber (B) is 3 to 40 parts by mass per 100 parts by mass of the unmodified liquid diene rubber (B'), and is preferably in the range of 3 to 35 parts by mass, more preferably in the range of 3 to 30 parts by mass, and still more preferably in the range of 3 to 20 parts by mass. If the amount of the modifying agent added is larger than 40 parts by mass, the obtainable crosslinked products tend to have poor elongation and low tensile strength. If added in an amount smaller than 3 parts by mass, the modifying agent does not provide sufficient effects in enhancing the tensile break strength and the abrasion resistance of the obtainable crosslinked products, and also fails to provide sufficient enhancements in steering stability, ice grip performance and rolling resistance performance of the crosslinked products used as tires or the like. The amount of the modifying agent introduced in the modified liquid diene rubber (B) may be calculated based on the acid value of the modifying agent described later, or may be determined with various analyzers such as an infrared spectrometer or a nuclear magnetic resonance spectrometer.

The average number of functional groups derived from the modifying agent is 5 to 80, preferably 10 to 80, and more preferably 10 to 70 per molecule of the modified liquid diene rubber (B). This average number of functional groups ensures that the dispersibility of a filler (C) described later in the obtainable rubber composition will be enhanced and consequently the composition can give crosslinked products such as, for example, tires attaining good performances such as steering stability, ice grip performance and rolling resistance performance. Further, the crosslinked products of the rubber composition attain enhancements in such properties as tensile break strength and abrasion resistance. For use in applications which particularly require ice grip performance, the average number of functional groups is preferably 5 to 40. From the points of view of abrasion resistance and steering stability, the average number of functional groups is still more preferably 10 to 40.

The average number of functional groups per molecule of the modified liquid diene rubber (B) may be calculated from the functional group equivalent weight (g/eq) described below and the styrene equivalent number average molecular weight Mn of the modified liquid diene rubber (B).

(Average number of functional groups per molecule)=[(Number average molecular weight Mn)/(Molecular weight of styrene unit)×(Average molecular weight of units of butadiene and optional monomers other than butadiene)]/(Functional group equivalent weight)

The functional group equivalent weight of the modified liquid diene rubber (B) is preferably in the range of 150 to 6,500 g/eq, more preferably 200 to 5,000 g/eq, and still more preferably 300 to 3000 g/eq. This functional group equivalent weight of the modified liquid diene rubber (B) ensures that the dispersibility of a filler (C) in the obtainable rubber composition will be enhanced and consequently the composition can give crosslinked products such as, for example, tires attaining good performances such as steering stability, ice grip performance and rolling resistance performance. Further, the crosslinked products of the rubber composition attain enhancements in such properties as tensile break strength and abrasion resistance. In the present specification, the functional group equivalent weight indicates the mass of butadiene and optional monomers other than butadiene that are bonded together per one functional group. The functional group equivalent weight may be calculated from the ratio of the area of peaks assigned to the functional groups to the area of a peak assigned to the polymer main chains using $^1$H-NMR or $^{13}$C-NMR, or may be calculated by a technique such as acid value measurement described later.

The reaction ratio of the modifying agent added to the modified liquid diene rubber (B) is 40 to 100 mol %, preferably 60 to 100 mol %, more preferably 80 to 100 mol %, and still more preferably 90 to 100 mol %. When the addition reaction ratio is in this range, the obtainable modified liquid diene rubber (B) contains little residues of the modifying agent and low-molecular compounds derived from the modifying agent and consequently it is possible to prevent more efficiently adverse effects caused by such residual compounds such as, for example, the contamination of molds by acid components such as maleic anhydride. When, for example, an unsaturated carboxylic acid or an unsaturated carboxylic acid derivative is used as the modifying agent, the addition reaction ratio of such a modifying agent may be determined by calculating the amount of the unreacted modifying agent by, for example, comparing the acid values of the modified sample before and after washing.

In the modified liquid diene rubber (B), the functional groups may be introduced at polymer ends or polymer side chains. The introduction sites are preferably polymer side chains in view of the fact that a plurality of functional groups can be introduced easily. The functional groups may belong to a single kind or may be a mixture of two or more kinds. That is, the modified liquid diene rubber (B) may be modified with a single kind of the modifying agent or with two or more kinds of the modifying agents.

In the case where the modifying agent introduced in the modified liquid diene rubber (B) is any of unsaturated carboxylic acids and unsaturated carboxylic acid derivatives such as unsaturated dicarboxylic acid anhydrides, unsaturated dicarboxylic acid monoesters and unsaturated dicarboxylic acid monoamides, the acid value of the modified liquid diene rubber (B) in terms of free carboxylic acid is usually 15 to 150 mgKOH, preferably 17 to 120, and more preferably 20 to 100. When the acid value is in this range, a good balance is obtained between rolling resistance performance and ice grip performance.

The acid value of the modified liquid diene rubber (B) may be determined by washing a sample with methanol (5 mL per 1 g of the sample) four times to remove impurities such as an oxidation inhibitor, vacuum drying the sample at 80° C. for 12 hours, dissolving 3 g of the sample by the addition of 180 mL of toluene and 20 mL of ethanol, and titrating the solution with a 0.1 N ethanol solution of potassium hydroxide to neutrality.

To produce the modified liquid diene rubber (B) described above which is modified with a specific amount of the modifying agent and has an average number of functional groups and an addition reaction ratio in the specific ranges, it is effective that the addition reaction of the modifying agent be performed at an appropriate reaction temperature for a sufficient reaction time. For example, the reaction in which the modifying agent is added to the unmodified liquid diene rubber (B') is preferably performed at a temperature of 100 to 200° C., or more preferably 120° C. to 180° C. for a reaction time of 3 to 200 hours, more preferably 4 to 100 hours, or still more preferably 5 to 50 hours.

The melt viscosity of the modified liquid diene rubber (B) as measured at 38° C. is preferably in the range of 50 to 3,000 Pa·s, more preferably in the range of 50 to 2,000 Pa·s, and still more preferably in the range of 50 to 1,000 Pa·s. When the melt viscosity of the modified liquid diene rubber (B) is in this range, the process flow efficiency is enhanced and good economic efficiency is obtained. Further, the above melt viscosity ensures that the obtainable rubber composition can be kneaded easily and can be processed with enhanced efficiency. In the present invention, the melt viscosity of the liquid diene rubber (B) is a value measured with a Brookfield viscometer at 38° C.

The weight average molecular weight (Mw) of the modified liquid diene rubber (B) is 25,000 to 120,000, preferably 25,000 to 100,000, more preferably 25,000 to 90,000, still more preferably 25,000 to 80,000, and even more preferably 30,000 to 70,000. In the invention, the Mw of the liquid diene rubber (B) is a weight average molecular weight measured by gel permeation chromatography (GPC) relative to polystyrenes. The above range of the Mw of the modified liquid diene rubber (B) ensures that the process flow efficiency is enhanced and good economic efficiency is obtained, and that the rubber composition of the invention attains good processability. Further, the dispersibility of a filler (C) described later in the obtainable rubber composition is enhanced and consequently the composition can give crosslinked products such as, for example, tires attaining good performances such as steering stability, ice grip performance and rolling resistance performance. Furthermore, the crosslinked products of the rubber composition attain enhancements in such properties as tensile break strength and abrasion resistance. In the invention, two or more kinds of the modified liquid diene rubbers (B) having different molecular weights Mw may be used in combination.

The molecular weight distribution (Mw/Mn) of the modified liquid diene rubber (B) is preferably 1.0 to 8.0, more preferably 1.0 to 5.0, and still more preferably 1.0 to 3.0. This Mw/Mn is advantageous in that the obtainable modified liquid diene rubber (B) has a small variation in viscosity.

The peak top molecular weight (Mt) of the modified liquid diene rubber (B) is 25,000 to 120,000, preferably 25,000 to 90,000, more preferably 25,000 to 80,000, and still more preferably 30,000 to 70,000. This Mt of the modified liquid diene rubber (B) ensures that the rubber composition of the present invention will exhibit good processability and that the dispersibility of a filler (C) in the obtainable rubber composition will be enhanced and consequently the composition can give crosslinked products such as, for example, tires having good rolling resistance performance. Further, the crosslinked products of the rubber composition attain an enhancement in low migration properties. In the present invention, the Mt of the liquid diene rubber (B) is the peak top molecular weight measured by gel permeation chromatography (GPC) relative to polystyrenes.

Provided that the total area of peaks assigned to polymer components in a GPC chromatogram obtained by the GPC measurement of the modified liquid diene rubber (B) is 100%, the proportion of polymer components having a molecular weight of Mt×1.45 or above is preferably in the range of 0 to 20%. The incorporation of such a modified liquid diene rubber (B) results in a rubber composition that can give crosslinked products which have outstanding properties such as mechanical strength and abrasion resistance and which attain an enhancement in rolling resistance performance. Further, the incorporation makes it possible to increase the hardness of the crosslinked products. Although the detailed reasons for these effects are not clear, it is probable that the presence of polymer components having a molecular weight of Mt×1.45 or above, typically, high-molecular components derived from byproducts such as coupled products, in a proportion exceeding the above range results in an increase in steric hindrance which inhibits efficient modification of the unmodified liquid diene rubber (B'), and consequently the effects of the functional groups introduced in the polymer are decreased.

From the points of view of mechanical strength, rolling resistance performance and hardness, it is preferable that the proportion of polymer components having a molecular weight of Mt×1.45 or above be in the range of 0 to 15%, and more preferably in the range of 0 to 10%. In the present invention, the proportion of polymer components having a molecular weight of Mt×1.45 or above is the ratio of the area of peaks assigned to such polymer components in a GPC chromatogram recorded by gel permeation chromatography (GPC) under the conditions described later in Examples relative to the area of all the polymer peaks (the area enclosed by the GPC chromatogram and the baseline) taken as 100%.

For example, the modified liquid diene rubber (B) having such a specific molecular weight distribution may be produced by purifying the unmodified liquid diene rubber (B') to remove sufficiently any components that will inhibit the addition reaction of the modifying agent. The purification is preferably washing with water or warm water, an organic solvent such as methanol or acetone, or supercritical fluid carbon dioxide.

Another effective approach to producing the modified liquid diene rubber (B) having the specific molecular weight distribution is to add an antioxidant during the addition reaction of the modifying agent. Preferred examples of the antioxidants used in this process include 2,6-di-t-butyl-4-methylphenol (BHT), 2,2'-methylenebis(4-methyl-6-t-butylphenol), 4,4'-thiobis(3-methyl-6-t-butylphenol), 4,4'-butylidenebis(3-methyl-6-t-butylphenol) (AO-40), 3,9-bis[1,1-dimethyl-2-[3-(3-t-butyl-4-hydroxy-5-methylphenyl)propionyloxy]ethyl]-2,4,8,10-tetraoxaspiro[5.5]undecane (AO-80), 2,4-bis[(octylthio)methyl]-6-methylphenol (Irganox 1520L), 2,4-bis[(dodecylthio)methyl]-6-methylphenol (Irganox 1726), 2-[1-(2-hydroxy-3,5-di-t-pentylphenyl)ethyl]-4,6-di-t-pentylphenyl acrylate (Sumilizer GS), 2-t-butyl-6-(3-t-butyl-2-hydroxy-5-methylbenzyl)-4-methylphenyl acrylate (Sumilizer GM), 6-t-butyl-4-[3-(2,4,8,10-tetra-t-butyldibenzo[d,f][1,3,2]dioxaphosphepin-6-yloxy)propyl]-2-methylphenol (Sumilizer GP), tris(2,4-di-t-butylphenyl) phosphite (Irgafos 168), dioctadecyl 3,3'-dithiobispropionate, hydroquinone, p-methoxyphenol, N-phenyl-N'-(1,3-dimethylbutyl)-p-phenylenediamine (Nocrac 6C), bis(2,2,6,6-tetramethyl-4-piperidyl) sebacate (LA-77Y), N,N-dioctadecylhydroxylamine (Irgastab FS 042) and bis(4-t-octylphenyl)amine (Irganox 5057). The antioxidants may be used singly, or two or more may be used in combination.

The amount of the antioxidants added is preferably 0.01 to 10 parts by mass, and more preferably 0.1 to 3 parts by mass per 100 parts by mass of the unmodified liquid diene rubber (B') or the modified liquid diene rubber (B).

The glass transition temperature (Tg) of the modified liquid diene rubber (B) is variable depending on factors such as the vinyl contents in the butadiene units and the conjugated diene (b1) units, the type of the conjugated diene (b1) and the content of the units derived from monomers other than the conjugated dienes, but is preferably −100 to 10° C., more preferably −100 to 0° C., and still more preferably −100 to −5° C. This Tg ensures that the rubber composition can give crosslinked products such as tires attaining good rolling resistance performance, and further ensures that the increase in viscosity is suppressed and the composition can be handled easily. The vinyl content in the modified liquid diene rubber (B) is preferably not more than 99 mass %, and more preferably not more than 90 mass %. The modified liquid diene rubbers (B) may be used singly, or two or more may be used in combination.

In the liquid diene rubber (B), the catalyst residue content derived from the polymerization catalyst used in the rubber production is preferably in the range of 0 to 200 ppm in terms of metal. When, for example, the polymerization catalyst used for the production of the liquid diene rubber (B) is an organoalkali metal such as an organolithium compound, the metal based on which the catalyst residue content is determined is the alkali metal such as lithium. The above catalyst residue content ensures that a decrease in tackiness during processing or the like will be avoided and that the rubber composition of the invention will give crosslinked products attaining enhancements in heat resistance and rolling resistance performance of tires. The catalyst residue content derived from the polymerization catalyst used in the production of the liquid diene rubber (B) is more preferably 0 to 150 ppm, and still more preferably 0 to 100 ppm in terms of metal. The catalyst residue content may be measured with, for example, a polarized Zeeman atomic absorption spectrophotometer.

For example, the catalyst residue content in the liquid diene rubber may be controlled to the above specific range by purifying the liquid diene rubber (B) after the polymerization to remove sufficiently the catalyst residue. The purification is preferably washing with water or warm water, an organic solvent such as methanol or acetone, or supercritical fluid carbon dioxide. From the economic viewpoint, the number of washing processes is preferably 1 to 20 times, and more preferably 1 to 10 times. The washing temperature is preferably 20 to 100° C., and more preferably 40 to 90° C. Prior to the polymerization reaction, the monomers may be purified by distillation or with an adsorbent to remove impurities that will inhibit the polymerization. Such purification allows the polymerization to take place with a reduced amount of the polymerization catalyst, thus making it possible to reduce the catalyst residue content.

In the rubber composition of the invention, the content of the modified liquid diene rubber (B) is 0.1 to 10 parts by mass per 100 parts by mass of the solid rubber (A), and is preferably 0.5 to 10 parts by mass, more preferably 1 to 10 parts by mass, and still more preferably 2 to 10 parts by mass. This content of the modified liquid diene rubber (B) ensures that the rubber composition will exhibit good processability and give crosslinked products having excellent properties, for example, mechanical strength such as tensile break strength, and abrasion resistance, and further ensures that products such as tires using the composition will attain excellent performances such as steering stability, ice grip performance and rolling resistance performance.

[Fillers (C)]

Examples of the fillers (C) used in the rubber composition of the invention include inorganic fillers such as carbon blacks, silicas, clays, micas, calcium carbonate, magnesium hydroxide, aluminum hydroxide, barium sulfate, titanium oxides, glass fibers, fibrous fillers and glass balloons; and organic fillers such as resin particles, wood powders and cork powders. The incorporation of such fillers makes it possible to attain improvements in the properties of the rubber composition such as mechanical strength, heat resistance and weather resistance, to control the hardness and to increase the amount of the rubbers.

To attain improvements in properties such as mechanical strength, carbon blacks and silicas are preferable as the fillers (C).

Examples of the carbon blacks include furnace blacks, channel blacks, thermal blacks, acetylene blacks and Ketjen blacks. From the point of view of enhancing the crosslinking rate and the mechanical strength, furnace blacks are preferable among the above carbon blacks. The carbon blacks may be used singly, or two or more may be used in combination.

To attain enhancements in properties such as dispersibility, mechanical strength and hardness, the average particle diameter of the carbon blacks is preferably 5 to 100 nm, more preferably 5 to 80 nm, and still more preferably 5 to 70 nm.

Examples of the commercially available furnace blacks include "DIABLACK" manufactured by Mitsubishi Chemical Corporation and "SEAST" manufactured by Tokai Carbon Co., Ltd. Examples of the commercially available acetylene blacks include "DENKA BLACK" manufactured by Denka Company Limited. Examples of the commercially available Ketjen blacks include "ECP600JD" manufactured by Lion Specialty Chemicals Co., Ltd.

To attain enhancements in properties such as the wettability and dispersibility with respect to the solid rubber (A), the carbon blacks may be treated with acids such as nitric acid, sulfuric acid, hydrochloric acid and mixed acids of these acids, or may be subjected to surface oxidation treatment by heating in the presence of air. To enhance the mechanical strength of the inventive rubber composition and crosslinked products obtained from the composition, the carbon blacks may be heat treated at 2,000 to 3,000° C. in the presence of a graphitization catalyst. Preferred examples of the graphitization catalysts include boron, boron oxides (for example, $B_2O_2$, $B_2O_3$, $B_4O_3$ and $B_4O_5$), boron oxoacids (for example, orthoboric acid, metaboric acid and tetraboric acid) and salts thereof, boron carbides (for example, $B_4C$ and $B_6C$), boron nitride (BN) and other boron compounds.

The carbon blacks may be used after their grain size is adjusted by a technique such as crushing. Examples of the grinders which may be used for the crushing of the carbon blacks include high-speed rotary crushers (hammer mills, pin mills and cage mills), various ball mills (rotary mills, vibration mills and planetary mills) and stirring mills (bead mills, Attritor mills, flow tube type mills and annular mills).

The average particle diameter of the carbon blacks may be determined by measuring the diameters of the particles with a transmission electron microscope and calculating the average of the diameters.

Examples of the silicas include wet silicas (hydrous silicates), dry silicas (silicic anhydrides), calcium silicates and aluminum silicates. Of these silicas, wet silicas are preferable to attain further enhancements in processability, mechanical strength and abrasion resistance. The silicas may be used singly, or two or more may be used in combination.

To attain enhancements in processability, rolling resistance performance, mechanical strength and abrasion resistance, the average particle diameter of the silicas is preferably 0.5 to 200 nm, more preferably 5 to 150 nm, and still more preferably 10 to 100 nm.

The average particle diameter of the silicas may be determined by measuring the diameters of the particles with a transmission electron microscope and calculating the average of the diameters.

Of the carbon blacks and the silicas described above, the silicas are more preferable from the point of view of aspects such as enhancing the rolling resistance performance of the obtainable rubber composition and crosslinked products thereof.

In the rubber composition of the invention, the content of the fillers (C) is 20 to 150 parts by mass per 100 parts by mass of the solid rubber (A), and is preferably 25 to 130 parts by mass, and more preferably 25 to 110 parts by mass. This content of the fillers (C) ensures that the processability, the rolling resistance performance, the mechanical strength and the abrasion resistance are enhanced.

When any fillers other than the silicas and the carbon blacks are used as the fillers (C), the content thereof is preferably 20 to 120 parts by mass per 100 parts by mass of the solid rubber (A), and is more preferably 20 to 90 parts by mass, and still more preferably 20 to 80 parts by mass.

The fillers (C) may be used singly, or two or more may be used in combination.

[Additional Components]

The rubber composition of the invention may further include a crosslinking agent (D) for the crosslinking of the rubbers. Examples of the crosslinking agents (D) include sulfur, sulfur compounds, oxygen, organic peroxides, phenolic resins, amino resins, quinone and quinone dioxime derivatives, halogen compounds, aldehyde compounds, alcohol compounds, epoxy compounds, metal halides and organometal halides, and silane compounds. Examples of the sulfur compounds include morpholine disulfide and alkylphenol disulfides. Examples of the organic peroxides include cyclohexanone peroxide, methyl acetoacetate peroxide, tert-butyl peroxyisobutyrate, tert-butyl peroxybenzoate, benzoyl peroxide, lauroyl peroxide, dicumyl peroxide, di-tert-butyl peroxide and 1,3-bis(tert-butylperoxyisopropyl)benzene. The crosslinking agents (D) may be used singly, or two or more may be used in combination. From the point of view of the mechanical properties of crosslinked products, the amount of the crosslinking agents (D) is usually 0.1 to 10 parts by mass per 100 parts by mass of the solid rubber (A), and is preferably 0.5 to 10 parts by mass, and more preferably 0.8 to 5 parts by mass.

When the rubber composition of the invention contains a sulfur crosslinking agent (D) such as sulfur or a sulfur compound for the crosslinking (vulcanization) of the rubbers, the composition may further include a vulcanization accelerator (E). Examples of the vulcanization accelerators (E) include guanidine compounds, sulfenamide compounds, thiazole compounds, thiuram compounds, thiourea compounds, dithiocarbamic acid compounds, aldehyde-amine compounds, aldehyde-ammonia compounds, imidazoline compounds and xanthate compounds. The vulcanization accelerators (E) may be used singly, or two or more may be used in combination. The vulcanization accelerators (E) are usually used in an amount of 0.1 to 15 parts by mass, and preferably 0.1 to 10 parts by mass per 100 parts by mass of the solid rubber (A).

When the rubber composition of the invention contains a sulfur crosslinking agent (D) such as sulfur or a sulfur compound for the crosslinking (vulcanization) of the rubbers, the composition may further include a vulcanization aid (F). Examples of the vulcanization aids (F) include fatty acids such as stearic acid, metal oxides such as zinc oxide, and fatty acid metal salts such as zinc stearate. The vulcanization aids (F) may be used singly, or two or more may be used in combination. The vulcanization aids (F) are usually used in an amount of 0.1 to 15 parts by mass, and preferably 1 to 10 parts by mass per 100 parts by mass of the solid rubber (A).

When the rubber composition of the invention contains a silica as the filler (C), it is preferable that the composition further include a silane coupling agent. Examples of the silane coupling agents include sulfide compounds, mercapto compounds, vinyl compounds, amino compounds, glycidoxy compounds, nitro compounds and chloro compounds.

Examples of the sulfide compounds include bis(3-triethoxysilylpropyl) tetrasulfide, bis(2-triethoxysilylethyl) tetrasulfide, bis(3-trimethoxysilylpropyl) tetrasulfide, bis(2-trimethoxysilylethyl) tetrasulfide, bis(3-triethoxysilylpropyl) trisulfide, bis(3-trimethoxysilylpropyl) trisulfide, bis(3-triethoxysilylpropyl) disulfide, bis(3-trimethoxysilylpropyl) disulfide, 3-trimethoxysilylpropyl-N,N-dimethylthiocarbamoyl tetrasulfide, 3-triethoxysilylpropyl-N,N-dimethylthiocarbamoyl tetrasulfide, 2-trimethoxysilylethyl-N,N-dimethylthiocarbamoyl tetrasulfide, 3-trimethoxysilylpropyl benzothiazole tetrasulfide, 3-triethoxysilylpropyl benzothiazole tetrasulfide, 3-triethoxysilylpropyl methacrylate monosulfide and 3-trimethoxysilylpropyl methacrylate monosulfide.

Examples of the mercapto compounds include 3-mercaptopropyltrimethoxysilane, 3-mercaptopropyltriethoxysilane, 2-mercaptoethyltrimethoxysilane and 2-mercaptoethyltriethoxysilane.

Examples of the vinyl compounds include vinyltriethoxysilane and vinyltrimethoxysilane.

Examples of the amino compounds include 3-aminopropyltriethoxysilane, 3-aminopropyltrimethoxysilane, 3-(2-aminoethyl)aminopropyltriethoxysilane and 3-(2-aminoethyl)aminopropyltrimethoxysilane.

Examples of the glycidoxy compounds include γ-glycidoxypropyltriethoxysilane, γ-glycidoxypropyltrimethoxysilane, γ-glycidoxypropylmethyldiethoxysilane and γ-glycidoxypropylmethyldimethoxysilane.

Examples of the nitro compounds include 3-nitropropyltrimethoxysilane and 3-nitropropyltriethoxysilane.

Examples of the chloro compounds include 3-chloropropyltrimethoxysilane, 3-chloropropyltriethoxysilane, 2-chloroethyltrimethoxysilane and 2-chloroethyltriethoxysilane.

The silane coupling agents may be used singly, or two or more may be used in combination. Of the above silane coupling agents, bis(3-triethoxysilylpropyl) disulfide, bis(3-triethoxysilylpropyl) tetrasulfide and 3-mercaptopropyltrimethoxysilane are preferable because the addition of these compounds provides high effects and is cost-effective.

The silane coupling agents are preferably added in an amount of 0.1 to 30 parts by mass, more preferably 0.5 to 20 parts by mass, and still more preferably 1 to 15 parts by mass per 100 parts by mass of the silicas. This content of the silane coupling agents ensures that dispersibility, coupling effects, reinforcing effects and abrasion resistance are enhanced.

Where necessary, the rubber composition of the invention may include softeners in order to attain improvements in properties such as processability and fluidity while still ensuring that the advantageous effects of the invention are not impaired. Examples of the softeners include process oils such as silicone oils, aromatic oils, TDAEs (treated distilled aromatic extracts), MESs (mild extracted solvates), RAEs (residual aromatic extracts), paraffin oils and naphthenic oils, and resin components such as aliphatic hydrocarbon resins, alicyclic hydrocarbon resins, C9 resins, rosin resins, coumarone-indene resins and phenolic resins. When the rubber composition of the invention contains the process oil as the softener, the content thereof is preferably less than 50 parts by mass per 100 parts by mass of the solid rubber (A).

The rubber composition of the invention may contain additives as required in order to attain enhancements in properties such as weather resistance, heat resistance and oxidation resistance, while still achieving the advantageous effects of the invention. Examples of such additives include antioxidants, waxes, oxidation inhibitors, lubricants, light stabilizers, scorch inhibitors, processing aids, colorants such as pigments and coloring matters, flame retardants, antistatic agents, matting agents, antiblocking agents, UV absorbers, release agents, foaming agents, antibacterial agents, mildewproofing agents and perfumes. Examples of the oxidation inhibitors include hindered phenol compounds, phosphorus compounds, lactone compounds and hydroxyl compounds. Examples of the antioxidants include amine-ketone compounds, imidazole compounds, amine compounds, phenolic compounds, sulfur compounds and phosphorus compounds. The additives may be used singly, or two or more may be used in combination.

[Methods for Producing Rubber Compositions]

The rubber composition of the invention may be produced by any methods without limitation as long as the components can be mixed homogeneously. Examples of the apparatuses used in the production of the rubber composition include tangential or intermeshing internal kneaders such as kneader-ruders, Brabender mixers, Banbury mixers and internal mixers, single-screw extruders, twin-screw extruders, mixing rolls and rollers. The production of the rubber composition may be usually carried out at a temperature in the range of 70 to 270° C.

[Crosslinked Products]

Crosslinked products may be obtained by crosslinking the rubber composition of the invention. The conditions under which the rubber composition is crosslinked may be selected appropriately in accordance with factors such as use applications. When, for example, the rubber composition is crosslinked (vulcanized) in a mold with use of sulfur or a sulfur compound as the crosslinking agent, the crosslinking (vulcanization) may be usually performed at a crosslinking temperature of 120 to 200° C. and a pressure of 0.5 to 2.0 MPa.

The crosslinked products are preferably such that the modified liquid diene rubber (B) is extracted therefrom with an extraction ratio of not more than 20 mass %, more preferably not more than 15 mass %, and still more preferably not more than 10 mass %.

The extraction ratio may be calculated by soaking 2 g of the crosslinked product into 400 ml of toluene at 23° C. for 48 hours and determining the amount of the modified liquid diene rubber (B) extracted into toluene.

The rubber composition of the invention and the crosslinked products of the rubber composition may be used to constitute at least portions of tires. Such tires exhibit high mechanical strength such as tensile break strength and abrasion resistance, and also have excellent steering stability, ice grip performance and rolling resistance performance. Further, tires which use the rubber composition of the invention in at least portions of the tires can maintain the aforementioned characteristics such as mechanical strength during long use by virtue of little migration of the components such as the modified liquid diene rubber (B).

EXAMPLES

The present invention will be described in further detail by presenting Examples hereinbelow without limiting the scope of the invention to such Examples.

The following are the components used in Examples and Comparative Examples.

Solid Rubber (A)⟩

Oil-extended styrene butadiene rubber: JSR 1723 (manufactured by JSR Corporation)

(Rubber component: 100 parts by mass, oil component: 37.5 parts by mass)

Modified Liquid Diene Rubbers (B)⟩

Modified liquid polybutadienes and modified liquid polyisoprenes obtained in Production Examples 1 to 20 described later Filler (C)⟩

Silica: ULTRASIL 7000GR (manufactured by Evonik Degussa Japan)

Crosslinking Agent (D)⟩

Sulfur (sulfur fine powder 200 mesh, manufactured by Tsurumi Chemical Industry Co., Ltd.)

Vulcanization Accelerators (E)⟩

Vulcanization accelerator (1): Nocceler CZ-G (manufactured by Ouchi Shinko Chemical Industrial Co., Ltd.)

Vulcanization accelerator (2): Nocceler D (manufactured by Ouchi Shinko Chemical Industrial Co., Ltd.)

Vulcanization accelerator (3): Nocceler TBT-N (manufactured by Ouchi Shinko Chemical Industrial Co., Ltd.)

Vulcanization Aids (F)⟩

Stearic acid: LUNAC S-20 (manufactured by Kao Corporation)

Zinc oxide: zinc oxide (manufactured by Sakai Chemical Industry Co., Ltd.)

Optional Components⟩

TDAE: VivaTec 500 (manufactured by H&R)

Silane coupling agent: Si-69 (manufactured by Evonik Degussa Japan)

Antioxidant (1): Nocrac 6C (manufactured by Ouchi Shinko Chemical Industrial Co., Ltd.)

Wax: SUNTIGHT S (manufactured by Seiko Chemical Co., Ltd.)

Production Example 1: Production of Modified Liquid Polybutadiene (B-1)

A thoroughly dried 5 L autoclave was purged with nitrogen and was loaded with 1140 g of hexane and 20.9 g of n-butyllithium (a 17 mass % hexane solution). After the temperature had been increased to 50° C., 1390 g of butadiene was added stepwise while performing stirring and while controlling the polymerization temperature at 50° C. Under such conditions, the polymerization was performed for 1 hour. The polymerization reaction was terminated by the addition of methanol. A polymer solution was thus obtained. Water was added to the polymer solution, and the mixture was stirred to wash the polymer solution with water. The stirring was terminated. After the liquid had been separated into the polymer solution phase and the aqueous phase, the water was removed. After the completion of washing, the polymer solution was vacuum dried at 70° C. for 24 hours to afford an unmodified liquid polybutadiene (B'-1).

Next, a 1 L-volume autoclave that had been purged with nitrogen was loaded with 300 g of the unmodified liquid polybutadiene (B'-1) obtained above, and 15 g of maleic anhydride and 0.3 g of Nocrac 6C were added. The reaction was performed at 170° C. for 24 hours. In this manner, a maleic anhydride-modified liquid polybutadiene (B-1) was obtained.

Production Example 2: Production of Modified Liquid Polybutadiene (B-2)

A 1 L-volume autoclave that had been purged with nitrogen was loaded with 300 g of an unmodified liquid polybutadiene (B'-1) obtained in the same manner as in Production Example 1, and 30 g of maleic anhydride and 0.3 g of Nocrac 6C were added. The reaction was performed at 170° C. for 24 hours. In this manner, a maleic anhydride-modified liquid polybutadiene (B-2) was obtained.

Production Example 3: Production of Modified Liquid Polybutadiene (B-3)

A thoroughly dried 5 L autoclave was purged with nitrogen and was loaded with 1920 g of hexane and 5.6 g of n-butyllithium (a 17 mass % hexane solution). After the temperature had been increased to 50° C., 670 g of butadiene was added stepwise while performing stirring and while controlling the polymerization temperature at 50° C. Under such conditions, the polymerization was performed for 1 hour. The polymerization reaction was terminated by the addition of methanol. A polymer solution was thus obtained. Water was added to the polymer solution, and the mixture was stirred to wash the polymer solution with water. The stirring was terminated. After the liquid had been separated into the polymer solution phase and the aqueous phase, the water was removed. After the completion of washing, the polymer solution was vacuum dried at 70° C. for 24 hours to afford an unmodified liquid polybutadiene (B'-2).

Next, a 1 L-volume autoclave that had been purged with nitrogen was loaded with 300 g of the unmodified liquid polybutadiene (B'-2) obtained above, and 30 g of maleic anhydride and 0.3 g of Nocrac 6C were added. The reaction was performed at 170° C. for 24 hours. In this manner, a maleic anhydride-modified liquid polybutadiene (B-3) was obtained.

Production Example 4: Production of Modified Liquid Polybutadiene (B-4)

A thoroughly dried 5 L autoclave was purged with nitrogen and was loaded with 1260 g of hexane and 36.3 g of n-butyllithium (a 17 mass % hexane solution). After the temperature had been increased to 50° C., 1260 g of butadiene was added stepwise while performing stirring and while controlling the polymerization temperature at 50° C. Under such conditions, the polymerization was performed for 1 hour. The polymerization reaction was terminated by the addition of methanol. A polymer solution was thus obtained. Water was added to the polymer solution, and the mixture was stirred to wash the polymer solution with water. The stirring was terminated. After the liquid had been separated into the polymer solution phase and the aqueous phase, the water was removed. After the completion of washing, the polymer solution was vacuum dried at 70° C. for 24 hours to afford an unmodified liquid polybutadiene (B'-3).

Next, a 1 L-volume autoclave that had been purged with nitrogen was loaded with 300 g of the unmodified liquid polybutadiene (B'-3) obtained above, and 30 g of maleic anhydride and 0.3 g of Nocrac 6C were added. The reaction was performed at 170° C. for 24 hours. In this manner, a maleic anhydride-modified liquid polybutadiene (B-4) was obtained.

Production Example 5: Production of Modified Liquid Butadiene-Isoprene Copolymer (B-5)

A thoroughly dried 5 L autoclave was purged with nitrogen and was loaded with 1265 g of hexane and 20.1 g of n-butyllithium (a 17 mass % hexane solution). After the temperature had been increased to 50° C., 1158 g of butadiene was added stepwise while performing stirring and while controlling the polymerization temperature at 50° C. Under such conditions, the polymerization was performed for 1 hour. Further, 127 g of isoprene was added stepwise, and the polymerization was performed for 1 hour. The polymerization reaction was terminated by the addition of methanol. A polymer solution was thus obtained. Water was added to the polymer solution, and the mixture was stirred to wash the polymer solution with water. The stirring was terminated. After the liquid had been separated into the polymer solution phase and the aqueous phase, the water was removed. After the completion of washing, the polymer solution was vacuum dried at 70° C. for 24 hours to afford an unmodified liquid butadiene-isoprene copolymer (B'-4).

Next, a 1 L-volume autoclave that had been purged with nitrogen was loaded with 300 g of the unmodified liquid butadiene-isoprene copolymer (B'-4) obtained above, and 15 g of maleic anhydride and 0.3 g of Nocrac 6C were added. The reaction was performed at 170° C. for 24 hours. In this manner, a maleic anhydride-modified liquid butadiene-isoprene copolymer (B-5) was obtained.

Production Example 6: Production of Modified Liquid Polybutadiene (B-6)

A 1 L-volume autoclave that had been purged with nitrogen was loaded with 300 g of an unmodified liquid polybutadiene (B'-3) obtained in the same manner as in Production Example 4, and 15 g of maleic anhydride and 0.3 g of Nocrac 6C were added. The reaction was performed at 170° C. for 24 hours. In this manner, a maleic anhydride-modified liquid polybutadiene (B-6) was obtained.

Production Example 7: Production of Modified Liquid Polybutadiene (B-7)

A 1 L-volume autoclave that had been purged with nitrogen was loaded with 300 g of an unmodified liquid polybutadiene (B'-3) obtained in the same manner as in Production Example 4, and 60 g of maleic anhydride and 0.3 g of Nocrac 6C were added. The reaction was performed at 170° C. for 24 hours. In this manner, a maleic anhydride-modified liquid polybutadiene (B-7) was obtained.

Production Example 8: Production of Modified Liquid Polybutadiene (B-8)

A 1 L-volume autoclave that had been purged with nitrogen was loaded with 300 g of an unmodified liquid polybutadiene (B'-1) obtained in the same manner as in Production Example 1, and 90 g of maleic anhydride and 0.3 g of Nocrac 6C were added. The reaction was performed at 170° C. for 24 hours. In this manner, a maleic anhydride-modified liquid polybutadiene (B-8) was obtained.

Production Example 9: Production of Modified Liquid Polybutadiene (B-9)

A 1 L-volume autoclave that had been purged with nitrogen was loaded with 300 g of an unmodified liquid polybutadiene (B'-1) obtained in the same manner as in Production Example 1, and 4.5 g of maleic anhydride and 0.3 g of Nocrac 6C were added. The reaction was performed at 170° C. for 24 hours. In this manner, a maleic anhydride-modified liquid polybutadiene (B-9) was obtained.

Production Example 10: Production of Modified Liquid Polyisoprene (B-10)

A thoroughly dried 5 L autoclave was purged with nitrogen and was loaded with 1200 g of hexane and 26.2 g of n-butyllithium (a 17 mass % hexane solution). After the temperature had been increased to 50° C., 1200 g of isoprene was added stepwise while performing stirring and while controlling the polymerization temperature at 50° C. Under such conditions, the polymerization was performed for 1 hour. The polymerization reaction was terminated by the addition of methanol. A polymer solution was thus obtained. Water was added to the polymer solution, and the mixture was stirred to wash the polymer solution with water. The stirring was terminated. After the liquid had been separated into the polymer solution phase and the aqueous phase, the water was removed. After the completion of washing, the polymer solution was vacuum dried at 70° C. for 24 hours to afford an unmodified liquid polyisoprene (B'-5).

Next, a 1 L-volume autoclave that had been purged with nitrogen was loaded with 300 g of the unmodified liquid polyisoprene (B'-5) obtained above, and 15 g of maleic anhydride and 0.3 g of Nocrac 6C were added. The reaction was performed at 170° C. for 24 hours. In this manner, a maleic anhydride-modified liquid polyisoprene (B-10) was obtained.

Production Example 11: Production of Modified Liquid Polybutadiene (B-11)

5.4 g of methanol was added to 315 g of a modified liquid polybutadiene obtained in the same manner as in Production Example 1, and the reaction was performed at 80° C. for 6 hours, thereby obtaining a maleic acid monomethyl ester-modified liquid polybutadiene (B-11).

Production Example 12: Production of Modified Liquid Polybutadiene (B-12)

10.8 g of methanol was added to 330 g of a modified liquid polybutadiene obtained in the same manner as in Production Example 2, and the reaction was performed at 80° C. for 6 hours, thereby obtaining a maleic acid monomethyl ester-modified liquid polybutadiene (B-12).

Production Example 13: Production of Modified Liquid Polybutadiene (B-13)

10.8 g of methanol was added to 330 g of a modified liquid polybutadiene obtained in the same manner as in Production Example 3, and the reaction was performed at 80° C. for 6 hours, thereby obtaining a maleic acid monomethyl ester-modified liquid polybutadiene (B-13).

Production Example 14: Production of Modified Liquid Polybutadiene (B-14)

10.8 g of methanol was added to 330 g of a modified liquid polybutadiene obtained in the same manner as in Production Example 4, and the reaction was performed at 80° C. for 6 hours, thereby obtaining a maleic acid monomethyl ester-modified liquid polybutadiene (B-14).

Production Example 15: Production of Modified Liquid Butadiene-Isoprene Copolymer (B-15)

5.4 g of methanol was added to 315 g of a modified liquid butadiene-isoprene copolymer obtained in the same manner as in Production Example 5, and the reaction was performed at 80° C. for 6 hours, thereby obtaining a maleic acid monomethyl ester-modified liquid butadiene-isoprene copolymer (B-15).

Production Example 16: Production of Modified Liquid Polybutadiene (B-16)

5.4 g of methanol was added to 315 g of a modified liquid polybutadiene obtained in the same manner as in Production Example 9, and the reaction was performed at 80° C. for 6 hours, thereby obtaining a maleic acid monomethyl ester-modified liquid polybutadiene (B-16).

Production Example 17: Production of Modified Liquid Polybutadiene (B-17)

21.6 g of methanol was added to 330 g of a modified liquid polybutadiene obtained in the same manner as in Production Example 4, and the reaction was performed at 80° C. for 6 hours, thereby obtaining a maleic acid monomethyl ester-modified liquid polybutadiene (B-17).

Production Example 18: Production of Modified Liquid Polybutadiene (B-18)

32.4 g of methanol was added to 330 g of a modified liquid polybutadiene obtained in the same manner as in Production Example 2, and the reaction was performed at 80° C. for 6 hours, thereby obtaining a maleic acid monomethyl ester-modified liquid polybutadiene (B-18).

Production Example 19: Production of Modified Liquid Polybutadiene (B-19)

1.8 g of methanol was added to 305 g of a modified liquid polybutadiene obtained in the same manner as in Production Example 6, and the reaction was performed at 80° C. for 6 hours, thereby obtaining a maleic acid monomethyl ester-modified liquid polybutadiene (B-19).

Production Example 20: Production of Modified Liquid Polyisoprene (B-20)

5.4 g of methanol was added to 315 g of a modified liquid polyisoprene obtained in the same manner as in Production Example 10, and the reaction was performed at 80° C. for 6 hours, thereby obtaining a maleic acid monomethyl ester-modified liquid polyisoprene (B-20).

Properties of components such as the modified liquid diene rubbers (B) were measured and calculated by the following methods.

(Methods for Measuring Weight Average Molecular Weight, Number Average Molecular Weight and Molecular Weight Distribution)

The Mw, Mn and Mw/Mn of the liquid diene rubbers (B) were measured by GPC (gel permeation chromatography) relative to standard polystyrenes. The measurement involved the following apparatus and conditions.

Apparatus: GPC apparatus "GPC 8020" manufactured by TOSOH CORPORATION

Separation column: "TSKgel G4000HXL" manufactured by TOSOH CORPORATION

Detector: "RI-8020" manufactured by TOSOH CORPORATION

Eluent: tetrahydrofuran

Eluent flow rate: 1.0 ml/min

Sample concentration: 5 mg/10 ml

Column temperature: 40° C.

(Method for Measuring Melt Viscosity)

The melt viscosity of the modified liquid diene rubbers (B) was measured at 38° C. with a Brookfield viscometer (manufactured by BROOKFIELD ENGINEERING LABS. INC.). "Fail" indicates that the viscosity was so high that an attempt of measurement failed.

(Acid Value)

A sample obtained after the modification reaction was washed with methanol (5 mL per 1 g of the sample) four times to remove impurities such as the oxidation inhibitor. The sample was then vacuum dried at 80° C. for 12 hours. 3 g of the sample of the modified rubber was dissolved by the addition of 180 mL of toluene and 20 mL of ethanol, and the solution was titrated with a 0.1 N ethanol solution of potassium hydroxide to neutrality, thereby determining the acid value.

$$\text{Acid value (mgKOH/g)} = (A-B) \times F \times 5.611/S$$

A: volume (mL) of 0.1 N potassium hydroxide ethanol solution titrated to neutrality B: volume (mL) of sample-free blank 0.1 N potassium hydroxide ethanol solution titrated F: titer of 0.1 N potassium hydroxide ethanol solution S: mass of sample (g)

(Functional Group Equivalent Weight)

Based on the acid value, calculations were made to determine the mass of functional groups present per 1 g of the modified liquid diene rubber (B), and the mass of the structures except the functional groups (the mass of the polymer main chains) per 1 g of the rubber. The functional group equivalent weight (g/eq) was calculated using the following equations.

[Mass of functional groups per 1 g]=[Acid value]/[56.11]×[Molecular weight of functional group]/1000

[Mass of polymer main chains per 1 g]=1−[Mass of functional groups per 1 g]

[Functional group equivalent weight]=[Mass of polymer main chains per 1 g]/([Mass of functional groups per 1 g]/[Molecular weight of functional group]

(Amount of Modifying Agent Added)

Using the following equation, the amount [parts by mass] of the modifying agent added per 100 parts by mass of the unmodified liquid diene rubber was calculated.

[Amount of modifying agent added]=[Mass of functional groups per 1 g]/[Mass of polymer main chains per 1 g]×100

(Average Number of Functional Groups Per Molecule)

Based on the functional group equivalent weight (g/eq) and the styrene-equivalent number average molecular weight Mn of the modified liquid diene rubber (B), the average number of functional groups per molecule was calculated using the following equation (unit: groups).

[Average number of functional groups per molecule] (groups)={[Number average molecular weight]/[Molecular weight of styrene unit]×[Average molecular weight of units of butadiene and optional monomers other than butadiene]}/[Functional group equivalent weight]

into an internal Banbury mixer and were kneaded together at a start temperature of 60° C. for 6 minutes so that the resin temperature reached 160° C. Thereafter, the kneaded mixture was removed from the mixer and was cooled to room temperature. The mixture was placed into the Banbury mixer again, and the crosslinking agent (D) and the vulcanization accelerators (E) were added. The mixture was kneaded at 100° C. for 75 seconds. A rubber composition was thus obtained.

The rubber composition obtained was subjected to press forming (160° C., 30 to 45 minutes) to give a crosslinked (vulcanized rubber) sheet (2 mm in thickness). The sheet was tested by the methods described below to evaluate the tensile break strength, the abrasion resistance, the steering stability, the rolling resistance performance and the ice grip performance. The results are described in Table 2.

The measurement methods for the above evaluations will be described below.

(1) Tensile Break Strength

The crosslinked sheets fabricated in Examples and Comparative Examples were each punched to give a dumbbell test piece in accordance with JIS 3. The test piece was tested on a tensile tester manufactured by INSTRON in accordance with JIS K 6251 to determine the tensile break strength. The data obtained in Examples and Comparative Examples are values relative to the value of Comparative Example 3 taken as 100. The larger the value, the more excellent the fracture characteristics.

(2) Abrasion Resistance

The DIN abrasion loss was measured with a load of 10 N and an abrasion distance of 40 min accordance with JIS K 6264. The data of Examples and Comparative Examples shown in Table 2 are values relative to the reciprocal of the DIN abrasion loss obtained in Comparative Example 3 taken

TABLE 1

| Modified liquid diene rubber | Weight average molecular weight (×10³) | Number average molecular weight (×10³) | Melt viscosity (38° C.) (Pa · s) | Acid value (mgKOH) | Functional group equivalent weight (g/eq) | Amount of modifying agent added (parts by mass) | Average number of functional groups per molecule (groups) |
|---|---|---|---|---|---|---|---|
| Modified polybutadiene (B-1) | 45 | 44 | 832 | 27.4 | 1950 | 5.0 | 11.7 |
| Modified polybutadiene (B-2) | 48 | 46 | Fail | 53.1 | 959 | 10.2 | 24.9 |
| Modified polybutadiene (B-3) | 94 | 91 | Fail | 51.4 | 994 | 9.9 | 47.6 |
| Modified polybutadiene (B-4) | 29 | 27 | 294 | 52.5 | 971 | 10.1 | 14.4 |
| Modified butadiene-isoprene copolymer (B-5) | 50 | 47 | 1546 | 27.1 | 1972 | 5.0 | 12.7 |
| Modified polybutadiene (B-6) | 29 | 27 | 95 | 27.3 | 1957 | 5.0 | 7.2 |
| Modified polybutadiene (B-7) | 30 | 28 | 2500 | 93.0 | 505 | 19.4 | 28.8 |
| Modified polybutadiene (B-8) | 49 | 48 | Fail | 129.9 | 334 | 29.4 | 74.7 |
| Modified polybutadiene (B-9) | 49 | 46 | 382 | 8.4 | 6590 | 1.5 | 3.6 |
| Modified polyisoprene (B-10) | 34 | 30 | 198 | 27.3 | 1957 | 5.0 | 10.0 |
| Modified polybutadiene (B-11) | 45 | 43 | 2016 | 27.0 | 1948 | 6.7 | 11.5 |
| Modified polybutadiene (B-12) | 47 | 46 | Fail | 51.5 | 959 | 13.6 | 24.9 |
| Modified polybutadiene (B-13) | 94 | 90 | Fail | 49.9 | 994 | 13.1 | 47.0 |
| Modified polybutadiene (B-14) | 30 | 29 | 594 | 51.0 | 973 | 13.4 | 15.5 |
| Modified butadiene-isoprene copolymer (B-1 | 51 | 49 | Fail | 26.7 | 1971 | 6.6 | 13.2 |
| Modified polybutadiene (B-16) | 29 | 27 | 197 | 26.9 | 1956 | 6.7 | 7.2 |
| Modified polybutadiene (B-17) | 30 | 28 | Fail | 87.7 | 510 | 25.5 | 28.5 |
| Modified polybutadiene (B-18) | 48 | 46 | Fail | 122.9 | 327 | 39.8 | 73.2 |
| Modified polybutadiene (B-19) | 49 | 46 | 610 | 8.4 | 6590 | 2.0 | 3.6 |
| Modified polyisoprene (B-20) | 34 | 30 | 312 | 26.9 | 1956 | 6.7 | 10.0 |

Examples 1 to 8 and Comparative Examples 1 to 3

The solid rubber (A), the modified liquid diene rubber (B), the filler (C), the TDAE, the silane coupling agent, the vulcanization aids (F), the wax and the antioxidant were added in the amounts (parts by mass) described in Table 2 as 100. The larger the value, the smaller the abrasion loss and the more excellent the abrasion resistance.

(3) Steering Stability

The crosslinked sheets fabricated in Examples and Comparative Examples were each cut to give a test piece 40 mm in length and 7 mm in width. The test piece was tested on a dynamic viscoelasticity analyzer manufactured by GABO GmbH at a measurement temperature of 60° C., a frequency of 10 Hz, a static strain of 10% and a dynamic strain of 2% to determine |E*| as an indicator of steering stability. The data obtained in Examples and Comparative Examples are values relative to the value of Comparative Example 3 taken as 100. The larger the value, the more excellent the steering stability of the rubber composition.

(4) Rolling Resistance Performance

The crosslinked sheets fabricated in Examples and Comparative Examples were each cut to give a test piece 40 mm in length and 7 mm in width. The test piece was tested on a dynamic viscoelasticity analyzer manufactured by GABO GmbH at a measurement temperature of 60° C., a frequency of 10 Hz, a static strain of 10% and a dynamic strain of 2% to determine tan δ as an indicator of rolling resistance. The data obtained in Examples and Comparative Examples are values relative to the value of Comparative Example 3 taken as 100. The smaller the value, the more excellent the rolling resistance performance of the rubber composition.

(5) Ice Grip Performance

The crosslinked sheets fabricated in Examples and Comparative Examples were each cut to give a test piece 40 mm in length and 7 mm in width. The test piece was tested on a dynamic viscoelasticity analyzer manufactured by GABO GmbH at a measurement temperature of −20° C., a frequency of 10 Hz, a static strain of 10% and a dynamic strain of 2% to determine |E*| as an indicator of ice grip performance. The data obtained in Examples and Comparative Examples are values relative to the value of Comparative Example 3 taken as 100. The smaller the value, the more excellent the ice grip performance of the rubber composition.

TABLE 2

| | | | Examples | | | | | | | | Comparative Examples | | |
|---|---|---|---|---|---|---|---|---|---|---|---|---|---|
| | | | 1 | 2 | 3 | 4 | 5 | 6 | 7 | 8 | 1 | 2 | 3 |
| Amounts (parts by mass) | Component (A) | Oil-extended styrene butadiene rubber | 137.5 | 137.5 | 137.5 | 137.5 | 137.5 | 137.5 | 137.5 | 137.5 | 137.5 | 137.5 | 137.5 |
| | Component (B) | Modified polybutadiene (B-1) | 4 | | | | | | | | | | |
| | | Modified polybutadiene (B-2) | | 4 | | | | | | | | | |
| | | Modified polybutadiene (B-3) | | | 4 | | | | | | | | |
| | | Modified polybutadiene (B-4) | | | | 4 | | | | | | | |
| | | Modified butadiene-isoprene copolymer (B-5) | | | | | 4 | | | | | | |
| | | Modified polybutadiene (B-6) | | | | | | 4 | | | | | |
| | | Modified polybutadiene (B-7) | | | | | | | 4 | | | | |
| | | Modified polybutadiene (B-8) | | | | | | | | 4 | | | |
| | | Modified polybutadiene (B-9) | | | | | | | | | 4 | | |
| | | Modified polyisoprene (B-10) | | | | | | | | | | 4 | |
| | Component (C) | Silica | 72 | 72 | 72 | 72 | 72 | 72 | 72 | 72 | 72 | 72 | 72 |
| | Optional components | TDAE | 3.5 | 3.5 | 3.5 | 3.5 | 3.5 | 3.5 | 3.5 | 3.5 | 3.5 | 3.5 | 3.5 |
| | | Silane coupling agent | 5.76 | 5.76 | 5.76 | 5.76 | 5.76 | 5.76 | 5.76 | 5.76 | 5.76 | 5.76 | 5.76 |
| | | Zinc oxide | 3.5 | 3.5 | 3.5 | 3.5 | 3.5 | 3.5 | 3.5 | 3.5 | 3.5 | 3.5 | 3.5 |
| | | Stearic acid | 1 | 1 | 1 | 1 | 1 | 1 | 1 | 1 | 1 | 1 | 1 |
| | | Wax | 1 | 1 | 1 | 1 | 1 | 1 | 1 | 1 | 1 | 1 | 1 |
| | | Antioxidant (1) | 2 | 2 | 2 | 2 | 2 | 2 | 2 | 2 | 2 | 2 | 2 |
| | | Sulfur | 1.5 | 1.5 | 1.5 | 1.5 | 1.5 | 1.5 | 1.5 | 1.5 | 1.5 | 1.5 | 1.5 |
| | | Vulcanization accelerator (1) | 0.35 | 0.35 | 0.35 | 0.35 | 0.35 | 0.35 | 0.35 | 0.35 | 0.35 | 0.35 | 0.35 |
| | | Vulcanization accelerator (2) | 0.5 | 0.5 | 0.5 | 0.5 | 0.5 | 0.5 | 0.5 | 0.5 | 0.5 | 0.5 | 0.5 |
| | | Vulcanization accelerator (3) | 1.5 | 1.5 | 1.5 | 1.5 | 1.5 | 1.5 | 1.5 | 1.5 | 1.5 | 1.5 | 1.5 |
| | | Tensile break strength (relative value) | 102 | 102 | 100 | 101 | 101 | 100 | 101 | 100 | 98 | 99 | 100 |
| | | Abrasion resistance (relative value) | 108 | 109 | 110 | 101 | 103 | 100 | 102 | 105 | 100 | 97 | 100 |
| | | Steering stability at (|E*| at 60° C.) (relative value) | 101 | 103 | 105 | 103 | 100 | 100 | 100 | 102 | 94 | 100 | 100 |
| | | Rolling resistance performance (tan δ at 60° C.) (relative value) | 93 | 93 | 91 | 93 | 94 | 94 | 94 | 95 | 95 | 98 | 100 |
| | | Ice grip performance (|E*| at −20° C.) (relative value) | 92 | 93 | 95 | 92 | 92 | 92 | 93 | 95 | 92 | 101 | 100 |

The results in Table 2 have shown that the rubber compositions of Examples 1 to 8 satisfying the requirements in the present invention gave crosslinked products which outperformed the crosslinked product of the rubber composition of Comparative Example 3 containing no specific modified liquid diene rubber (B), in all of tensile break strength, abrasion resistance, steering stability, rolling resistance performance and ice grip performance. Further, the rubber compositions of Examples 1 to 8 satisfying the requirements in the invention have been shown to give crosslinked products which attained enhancements in all of tensile break strength, abrasion resistance, steering stability, rolling resistance performance and ice grip performance over the products of the composition of Comparative Example 1 which involved a modified liquid diene rubber (B) having a smaller average number of functional groups per molecule than specified, and of the composition of Comparative Example 2 which involved a modified liquid diene rubber (B) having no butadiene units.

Examples 9 to 16 and Comparative Examples 4 to 6

The solid rubber (A), the modified liquid diene rubber (B), the filler (C), the TDAE, the silane coupling agent, the vulcanization aids (F), the wax and the antioxidant were added in the amounts (parts by mass) described in Table 3 into an internal Banbury mixer and were kneaded together at a start temperature of 60° C. for 6 minutes so that the resin temperature reached 160° C. Thereafter, the kneaded mixture was removed from the mixer and was cooled to room temperature. The mixture was placed into the Banbury mixer again, and the crosslinking agent (D) and the vulcanization accelerators (E) were added. The mixture was kneaded at 100° C. for 75 seconds. A rubber composition was thus obtained.

The rubber composition obtained was subjected to press forming (160° C., 30 to 45 minutes) to give a crosslinked (vulcanized rubber) sheet (2 mm in thickness). The sheet was tested by the measurement methods similar to those described in Examples 1 to 8 and Comparative Examples 1 to 3. The data of the tensile break strength, the abrasion resistance, the steering stability, the rolling resistance performance and the ice grip performance are values relative to the values of Comparative Example 6 taken as 100. The results are described in Table 3.

TABLE 3

| | | | Examples | | | | | | | | Comparative Examples | | |
|---|---|---|---|---|---|---|---|---|---|---|---|---|---|
| | | | 9 | 10 | 11 | 12 | 13 | 14 | 15 | 16 | 4 | 5 | 6 |
| A-mounts (parts by mass) | Component (A) | Oil-extended styrene butadiene rubber | 137.5 | 137.5 | 137.5 | 137.5 | 137.5 | 137.5 | 137.5 | 137.5 | 137.5 | 137.5 | 137.5 |
| | Component (B) | Modified polybutadiene (B-11) | 4 | | | | | | | | | | |
| | | Modified polybutadiene (B-12) | | 4 | | | | | | | | | |
| | | Modified polybutadiene (B-13) | | | 4 | | | | | | | | |
| | | Modified polybutadiene (B-14) | | | | 4 | | | | | | | |
| | | Modified butadiene-isoprene copolymer (B-15) | | | | | 4 | | | | | | |
| | | Modified polybutadiene (B-16) | | | | | | 4 | | | | | |
| | | Modified polybutadiene (B-17) | | | | | | | 4 | | | | |
| | | Modified polybutadiene (B-18) | | | | | | | | 4 | | | |
| | | Modified polybutadiene (B-19) | | | | | | | | | 4 | | |
| | | Modified polyisoprene (B-20) | | | | | | | | | | 4 | |
| | Component (C) | Silica | 72 | 72 | 72 | 72 | 72 | 72 | 72 | 72 | 72 | 72 | 72 |
| | Optional components | TDAE | 3.5 | 3.5 | 3.5 | 3.5 | 3.5 | 3.5 | 3.5 | 3.5 | 3.5 | 3.5 | 3.5 |
| | | Silane coupling agent | 5.76 | 5.76 | 5.76 | 5.76 | 5.76 | 5.76 | 5.76 | 5.76 | 5.76 | 5.76 | 5.76 |
| | | Zinc oxide | 3.5 | 3.5 | 3.5 | 3.5 | 3.5 | 3.5 | 3.5 | 3.5 | 3.5 | 3.5 | 3.5 |
| | | Stearic acid | 1 | 1 | 1 | 1 | 1 | 1 | 1 | 1 | 1 | 1 | 1 |
| | | Wax | 1 | 1 | 1 | 1 | 1 | 1 | 1 | 1 | 1 | 1 | 1 |
| | | Antioxidant (1) | 2 | 2 | 2 | 2 | 2 | 2 | 2 | 2 | 2 | 2 | 2 |
| | | Sulfur | 1.5 | 1.5 | 1.5 | 1.5 | 1.5 | 1.5 | 1.5 | 1.5 | 1.5 | 1.5 | 1.5 |
| | | Vulcanization accelerator (1) | 0.35 | 0.35 | 0.35 | 0.35 | 0.35 | 0.35 | 0.35 | 0.35 | 0.35 | 0.35 | 0.35 |
| | | Vulcanization accelerator (2) | 0.5 | 0.5 | 0.5 | 0.5 | 0.5 | 0.5 | 0.5 | 0.5 | 0.5 | 0.5 | 0.5 |
| | | Vulcanization accelerator (3) | 1.5 | 1.5 | 1.5 | 1.5 | 1.5 | 1.5 | 1.5 | 1.5 | 1.5 | 1.5 | 1.5 |
| | | Tensile break strength (relative value) | 102 | 102 | 100 | 101 | 101 | 100 | 100 | 100 | 99 | 99 | 100 |
| | | Abrasion resistance (relative value) | 108 | 106 | 111 | 102 | 106 | 102 | 102 | 105 | 99 | 96 | 100 |
| | | Steering stability ($|E^*|$ at 60° C.) (relative value) | 108 | 111 | 112 | 112 | 110 | 106 | 111 | 106 | 102 | 107 | 100 |

TABLE 3-continued

|  | Examples | | | | | | | | Comparative Examples | | |
| --- | --- | --- | --- | --- | --- | --- | --- | --- | --- | --- | --- |
|  | 9 | 10 | 11 | 12 | 13 | 14 | 15 | 16 | 4 | 5 | 6 |
| Rolling resistance performance (tanδ at 60° C.) (relative value) | 90 | 90 | 89 | 89 | 91 | 92 | 92 | 92 | 93 | 95 | 100 |
| Ice grip performance (|E*| at −20° C.) (relative value) | 93 | 95 | 96 | 95 | 95 | 93 | 95 | 97 | 93 | 100 | 100 |

The results in Table 3 have shown that the rubber compositions of Examples 9 to 16 satisfying the requirements in the present invention gave crosslinked products which outperformed the crosslinked product of the rubber composition of Comparative Example 6 containing no specific modified liquid diene rubber (B), in all of tensile break strength, abrasion resistance, steering stability, rolling resistance performance and ice grip performance. Further, the rubber compositions of Examples 9 to 16 satisfying the requirements in the invention have been shown to give crosslinked products which attained enhancements in all of tensile break strength, abrasion resistance, steering stability, rolling resistance performance and ice grip performance over the products of the composition of Comparative Example 4 which involved a modified liquid diene rubber (B) having a smaller average number of functional groups per molecule than specified, and of the composition of Comparative Example 5 which involved a modified liquid diene rubber (B) having no butadiene units.

INDUSTRIAL APPLICABILITY

The rubber compositions of the present invention have excellent processability and filler dispersibility. The rubber compositions attain crosslinking properties by, for example, being combined with crosslinking agents, and can give crosslinked products having excellent properties such as mechanical strength and abrasion resistance. Thus, the inventive compositions may be suitably used in applications such as industrial parts, for example, tires, industrial belts and industrial rubber hoses. In particular, the use of the crosslinked products in such applications as tires is advantageous in that no only rolling resistance performance is enhanced but also simultaneous enhancements in steering stability and ice grip performance are achieved.

The invention claimed is:

1. A rubber composition, consisting of:
(A) 100 parts by mass of a solid rubber (A),
(B) 0.1 to 10 parts by mass of a modified liquid diene rubber (B) that is obtained by adding a modifying agent to an unmodified liquid diene rubber (B') and has functional groups derived from the modifying agent,
(C) 20 to 150 parts by mass of a filler (C) consisting of an inorganic filler, and
(D) optionally at least one additional component selected from the group consisting of a crosslinking agent (D), a vulcanization accelerator (E), a vulcanization aid (F), a silane coupling agent, a softener, an antioxidant, a wax, an oxidation inhibitor, a lubricant, a light stabilizer, a scorch inhibitor, a processing aid, a colorant, a flame retardant, an antistatic agent, a matting agent, an antiblocking agent, a UV absorber, a release agent, a foaming agent, an antibacterial agent, a mildew-proofing agent, and a perfume, wherein:
the modified liquid diene rubber (B) satisfies the following (i) to (iv):
(i) a content of butadiene units is not less than 50 mass % relative to the total of all monomer units,
(ii) a weight average molecular weight (Mw) is 25,000 to 120,000,
(iii) an amount of the modifying agent added is 3 to 40 parts by mass per 100 parts by mass of the unmodified liquid diene rubber (B'), and
(iv) an average number of functional groups per molecule of the modified liquid diene rubber (B) is 5 to 80, and
the modified liquid diene rubber (B) has a peak top molecular weight (Mt) of 25,000 to 120,000.

2. The rubber composition according to claim 1, wherein the modified liquid diene rubber (B) has a functional group equivalent weight of 150 to 6,500 g/eq.

3. The rubber composition according to claim 1, wherein the inorganic filler is at least one inorganic filler selected from the group consisting of a carbon black and a silica.

4. The rubber composition according to claim 1, wherein the inorganic filler is at least one inorganic filler selected from the group consisting of a carbon black, a silica, a clay, a mica, calcium carbonate, magnesium hydroxide, aluminum hydroxide, barium sulfate, a titanium oxide, a glass fiber, a fibrous filler and a glass balloon.

5. The rubber composition according to claim 1, wherein the modified liquid diene rubber (B) has a peak top molecular weight (Mt) of 25,000 to 90,000.

6. The rubber composition according to claim 1, wherein the modified liquid diene rubber (B) has a peak top molecular weight (Mt) of 25,000 to 80,000.

7. The rubber composition according to claim 1, wherein the modified liquid diene rubber (B) has a peak top molecular weight (Mt) of 30,000 to 70,000.

8. The rubber composition according to claim 1, wherein the modified liquid diene rubber (B) has a catalyst residue content derived from a polymerization catalyst used in production of the rubber of 0 to 200 ppm in terms of metal.

9. The rubber composition according to claim 1, wherein the modified liquid diene rubber (B) has a catalyst residue content derived from a polymerization catalyst used in production of the rubber of 0 to 150 ppm in terms of metal.

10. The rubber composition according to claim 1, wherein the modified liquid diene rubber (B) has a catalyst residue content derived from a polymerization catalyst used in production of the rubber of 0 to 100 ppm in terms of metal.

11. The rubber composition according to claim 1, wherein a proportion of polymer components of the modified liquid diene rubber (B) having a molecular weight of Mt×1.45 or above is 0 to 20%, assuming that a total area of peaks assigned to polymer components of the modified liquid diene rubber (B) in a GPC chromatogram obtained by GPC measurement of the modified liquid diene rubber (B) is 100%.

12. The rubber composition according to claim 1, wherein a content of butadiene units in the modified liquid diene rubber (B) is 100 mass % relative to a total mass of all monomer units.

13. The rubber composition according to claim 1, wherein a melt viscosity of the modified liquid diene rubber (B) measured at 38° C. is 50 to 2,000 Pa·s.

14. The rubber composition according to claim 1, wherein the inorganic filler is at least one inorganic filler selected from the group consisting of a silica, an untreated carbon black, a carbon black treated with acid, a carbon black subjected to surface oxidation treatment, and a carbon black heat treated at 2,000 to 3,000° C. in the presence of a graphitization catalyst.

15. The rubber composition according to claim 1, wherein the content of butadiene units in the modified liquid diene rubber (B) is 60 to 100 mass % relative to the total of all monomer units.

16. The rubber composition according to claim 1, wherein:
the antioxidant is present in the composition; and
the modified liquid diene rubber (B) is prepared by adding the antioxidant during the addition reaction of the modifying agent.

17. The rubber composition according to claim 1, the modified liquid diene rubber (B) is prepared by adding the antioxidant during the addition reaction of the modifying agent, the antioxidant being added in an amount of 0.01 to 10 parts by mass per 100 parts of the unmodified liquid diene rubber (B').

18. The rubber composition according to claim 1, wherein the functional groups possessed by the modified liquid diene rubber (B) are at least one selected from the group consisting of a carboxylic anhydride group, a dicarboxylic acid monoester group and a dicarboxylic acid monoamide group.

19. The rubber composition according to claim 18, wherein the functional groups possessed by the modified liquid diene rubber (B) are at least one selected from the group consisting of a maleic anhydride group, a succinic anhydride group, a maleic acid monoester group, a succinic acid monoester group, a maleic acid monoamide group and a succinic acid monoamide group.

20. A crosslinked product obtained by crosslinking the rubber composition of claim 1.

21. A tire, comprising the crosslinked product of claim 20 in at least a portion of the tire.

22. A tire, comprising the rubber composition of claim 1 in at least a portion of the tire.

* * * * *